United States Patent
Irons et al.

(10) Patent No.: US 6,952,281 B1
(45) Date of Patent: Oct. 4, 2005

(54) APPARATUS AND METHOD FOR DYNAMICALLY CREATING FAX COVER SHEETS CONTAINING DYNAMIC AND STATIC CONTENT ZONES

(75) Inventors: Steve W. Irons, Phoenix, AZ (US); Mark F. Wright, Mesa, AZ (US)

(73) Assignee: ImageTag, Inc., Chandler, AZ (US)

( * ) Notice: Subject to any disclaimer, the term of this patent is extended or adjusted under 35 U.S.C. 154(b) by 925 days.

(21) Appl. No.: 09/695,564

(22) Filed: Oct. 23, 2000

Related U.S. Application Data

(63) Continuation-in-part of application No. 09/001,228, filed on Dec. 30, 1997, now Pat. No. 6,192,165.

(51) Int. Cl.[7] .............................................. G06F 15/00

(52) U.S. Cl. .................... 358/1.15; 358/1.16; 715/505; 715/506; 715/507

(58) Field of Search .............................. 358/1.15, 1.16, 358/1.18, 400, 401, 444, 453, 450, 403, 501, 358/530, 468, 440; 705/35; 382/306, 305; 707/104.1, 1; 715/505, 506; 270/52.02, 52.01; 379/100.01, 100.07

(56) References Cited

U.S. PATENT DOCUMENTS

| | | | | |
|---|---|---|---|---|
| 5,282,052 A | * | 1/1994 | Johnson et al. | 358/402 |
| 5,465,167 A | * | 11/1995 | Cooper et al. | 358/468 |
| 2004/0107153 A1 | * | 6/2004 | Lundberg | 705/35 |

* cited by examiner

Primary Examiner—Kimberly Williams
Assistant Examiner—Thomas J. Lett
(74) Attorney, Agent, or Firm—Mark F. Wright; Wright Law Group, PLLC

(57) ABSTRACT

The present invention allows users to index and label documents prior to scanning/imaging and then use dynamically generated fax cover sheets and a fax machine to create digital images of the paper-based documents. Each dynamically-generated fax cover sheet will contain a globally unique document identifier and, if desired, other relevant document-specific or user-specific information. The document-specific information and the user-specific information is contained in dynamic content zones on the fax cover sheet. Each dynamically-generated fax cover sheet generated by the digital filing system will be globally unique, with respect to at least one of the dynamic content zones and no two dynamically-generated fax cover sheets will ever be identical. In addition, each dynamically-generated fax cover sheet may also contain static content zones which contain information that will be duplicated over a certain range of dynamically-generated fax cover sheets.

21 Claims, 17 Drawing Sheets

APPARATUS AND METHOD FOR DYNAMICALLY CREATING FAX COVER SHEETS CONTAINING DYNAMIC AND STATIC CONTENT ZONES

RELATED APPLICATION

This application is a continuation in part of U.S. patent application Ser. No. 09/001,228, filed Dec. 30, 1997, now U.S. Pat. No. 6,192,165.

BACKGROUND OF THE INVENTION

1. Technical Field

This invention generally relates to document management and more specifically relates to a system and method for indexing, imaging, storing, and retrieving paper-based documents.

2. Background Art

While most modern computer systems can be used for business, education and entertainment purposes, the most widespread application for computers today is related to processing information. Word processing, page layout, database, spreadsheet, and desktop publishing applications are used to prepare and disseminate information throughout society. The increased availability of computer systems and computer networks such as the Internet have made vast repositories of information available to a huge segment of our population. Indeed, as it has been widely discussed in the popular media, modern computer systems have brought our world into the "information age."

One of the promises of the information age ushered in by these omnipresent computer systems was the advent of a "paperless" society. Computers, in theory, would liberate the world from the flood of paper which currently impedes the flow and management of information. Computer-based systems with advanced information processing capabilities would supposedly allow the instantaneous electronic exchange of information from one location to another, without the necessity of "hard copy." Indeed, many businesses have embraced computer systems with the stated goal of eliminating, or at least significantly reducing, the seemingly endless stream of paper that flows into and out of an office. Reducing the burdens of paper-based information has become a widespread goal. However, the simple truth is that today we have more paper-based information, document processing labor costs, document storage overhead, and hard-copy related dependencies in our society than ever before.

In fact, the dream of a paperless society remains a faint gleam in the tired eyes of today's information workers. Reams and reams of paper continue to pile up on desktops and fill filing cabinets to overflowing in offices all over the world. If anything, the increased number of computers have exacerbated the rapidly increasing flow of paper in our society. In making information systems available to the masses, computers have allowed more and more people to generate ever growing quantities of paper which, in order to be useful, must be read and processed by someone, somewhere.

It is estimated that businesses worldwide generate more than 2 trillion pages of documents annually. In addition, in spite of the rapid proliferation of computer systems and computer users, it is estimated that less than 25% of the information used in the world today is available in a computer-accessible format. The average office worker spends 10%–40% of their time looking for information, much of it paper-based. And for every $1 spent producing a paper document, $10 dollar is spent to process and store that document. The very paperwork that drives most businesses and organizations is slowly starting to choke the productivity out of some of them as these businesses are unable to effectively and efficiently manage paper-based information.

Recognizing this problem, attempts have been made to better manage and control the paperwork that flows into the information stream each and every day. Some of these previously implemented solutions are based around the notion of creating, storing, and accessing electronic images directly in a computer system, bypassing hard copy completely. This solution makes sense only when a company or organization achieves fairly tight control over the generation and use of documents and can, therefore, effectively reduce the paper flow in certain situations. However, much of the paper burden in a given organization is directly attributable to paper-based documents that are generated by external sources. This means that most businesses and organizations, regardless of their internal systems, still receive and process paper-based information.

Other known solutions include document imaging systems which can scan paper-based documents and store/retrieve the resulting electronic images. Though many different document imaging systems have been commercialized since the late 1980s, none have gained widespread acceptance. Even though the quantifiable burdens of paper information storage, access and management are well known and uniformly decried, document imaging systems have not been broadly adopted as an alternative to the traditional filing cabinet. Document imaging systems today capture less than 1% of paper filing volumes. File cabinets continue to fill up, desktop stacks of paper continue to grow, and many business processes and desktops are still paper-bound. International Data Corporation (IDC) estimates that in 1997, U.S. business spent $25–35 billion on filing, storing and retrieving paper. This number approaches $100 billion when the total life cycle paper management costs are calculated, according to IDC.

A key reason for continued preference of paper-based document management over electronic document imaging systems, in spite of the problems and costs associated with the use of paper, stems from a fundamental impediment to the wide-scale adoption of imaging technology in the workplace. Basically, the lack of an efficient, cost-effective, adaptable method for driving paper through the scan and index process continues to thwart the efforts of most organizations that try to adopt wide-reaching document imaging solutions. The lack of simple, office automation platforms for image capture and indexing remains a key barrier to broadened use of document imaging.

Document capture (scanning and indexing) sub-systems are usually the most costly, labor-intensive, time-consuming, and error prone component of a traditional document imaging solution. To be effective, a paper-to-digital conversion system must address, at a minimum, the following activities: document aggregation; document preparation for scanning; document batching; document scanning; scanning quality controls; pre-committal image caching; document indexing; database updates; and permanent image storage. Traditional document imaging systems build an input assembly line of process workers, hardware, software, and related network activities to accomplish these tasks. They require network caching and transmission of in-process images, indexing stations with large viewing monitors to assist keystroking from the screen, and human and machine controls for the overall process of document input. The costly, integrated systems developed for these requirements generally institute a rigid process for a targeted, high-volume, structured paper flow. Because customized document input sub-systems are justified and built for targeted business applications, they do not adapt well to other, diversified document imaging needs, smaller workgroup filing systems, or ad hoc filing systems. Unfortunately, diverse, smaller workgroup filing, and ad hoc filing systems represent the bulk of paper filing. The paradigm of a document input assembly line does not match up well with many existing paper movement and filing patterns found in most businesses and organizations.

For example, most traditional document imaging systems operate a centralized input facility with dedicated scanning and indexing equipment and personnel. In this scenario, paper-based documents are funneled to the "imaging" department where document imaging workers identify, batch, organize, prepare, scan and index the documents. While this system is effective for imaging a high volume, structured paper flow, it is counter-intuitive to the natural flow and use of documents in most offices, and therefore, is not applicable. Most office workers receive a paper-based document at their desk and want to use it, then file it so that they or their co-workers can quickly retrieve the document when necessary. The original user of a document is usually the most qualified person to index it. Centralized control and disposition of documents abstracts the office worker from the source of their information and isolates the two entities.

Further, many of these traditional document imaging systems also require the acquisition of expensive new equipment and the training of new workers simply to manage and process the in-coming paper-based documents. This requirement adds a cost barrier to adoption that many organizations cannot overcome. In addition, many of the presently available document imaging systems employ proprietary software for creating, storing, and using document images. By design, these systems limit the availability of the electronic images to the audience within the proprietary document imaging system and thereby reduce the probability of document exchange with other systems and external organizations that may require access to a given document.

The challenges of adopting and implementing paper-to-digital image solutions are not limited to the mechanics and technologies of the document image capture process. Traditional document imaging technologies also introduce significant changes to the user's desktop and to the overall flow of documents in the business process. As previously mentioned, in most large scale document imaging environments, the end user is alienated from the entire imaging/indexing process and does not control the flow or disposition of their own documents. For a paper-to-digital document solution to be truly useful, the end user must be comfortable with the process and must embrace the new methods. User adoption factors are crucial because while the burdens associated with handling paper are ingrained and often accepted, the changes involved in adopting and implementing document imaging systems are wide-reaching and potentially disruptive.

In general, the successful implementation of a paper-to-digital document solution, and subsequent successful user adoption, depends on adequately addressing at least these basic issues:

Is there significant added cost and work involved in an image input process as opposed to traditional paper filing? If so, is the added cost worth it for the resulting image utility?

Can the system blend with traditional paper usage and maximize the advantage and user preferences of each medium (paper and image) in the information life cycle?

Can an electronic solution improve on the existing paper information management process, which starts when paper arrives at the desktop?

Can users easily learn and adapt to a new way to file paper (digitally)?

Will the new system exhibit proximity to existing paper processes and office automation resources as a point of departure?

Once these issues have been successfully addressed, an acceptable solution can be developed and adopted. However, without a better system and method for overcoming the significant limitations of the present document indexing, imaging, storage, retrieval, and handling systems, the world will be increasingly dependent on antiquated solutions which are continually decreasing productivity.

DISCLOSURE OF INVENTION

According to the preferred embodiments of the present invention, an apparatus and method for creating dynamically-generated fax cover sheets containing dynamic and static content zones are disclosed. When used in conjunction with a digital filing apparatus, such as that disclosed in U.S. patent application Ser. No. 09/001,228, users of the present invention will be able to use a standard fax machine as part of an overall system to quickly and easily file their paper-based documents on the Internet. In this context, digital filing refers to the efficient management of paper-based information from its receipt at the desktop through an indexing, scanning, image storage and image retrieval process.

The preferred embodiments of the present invention provide for easy and effective indexing, imaging, storing, retrieving and managing of paper-based documents, transforming them into electronic documents using a system which incorporates many existing office resources. The present invention allows users to index and label documents prior to scanning/imaging and then use dynamically generated fax cover sheets and a fax machine to create digital images of the paper-based documents. Each dynamically-generated fax cover sheet will contain a globally unique document identifier and, if desired, other relevant document-specific or user-specific information.

The document-specific information and the user-specific information is contained in dynamic content zones on the fax cover sheet. Each dynamically-generated fax cover sheet generated by the digital filing system will be globally unique, with respect to at least one of the dynamic content zones and no two dynamically-generated fax cover sheets will ever be identical. In addition, each dynamically-generated fax cover sheet may also contain static content zones which contain information that will be duplicated over a certain range of dynamically-generated fax cover sheets.

BRIEF DESCRIPTION OF DRAWINGS

The preferred embodiments of the present invention will hereinafter be described in conjunction with the appended drawings, wherein like designations denote like elements, and:

FIG. 4 is a typical label generated by the desktop label printer of FIG. 3 or the document labeling mechanism of FIG. 3a;

BEST MODE FOR CARRYING OUT THE INVENTION

The present invention provides a simple and efficient way to store and retrieve documents in a digital filing system. By using the preferred embodiments of the present invention, a comprehensive system of storing, managing, and retrieving digital images of paper-based documents can be realized.

DETAILED DESCRIPTION

The digital filing system and methods of the present invention provide a complete solution for indexing documents, imaging/scanning documents, storing documents, and retrieving documents. By implementing the present invention, a user can quickly and easily manage paper-based documents in any business environment. The digital filing process involves receiving a paper-based document, indexing the document at the user's workstation, affixing a globally unique document identifier to the document, imaging/scanning the document, extracting the globally unique document identifier from the label, and electronically storing the document using the document identifier contained in the label and the user supplied indexing information. This process enables generic document imaging, using common office infrastructure, while adapting to various preferences for paper document disposition.

In addition, by attaching a pre-printed, globally unique document identifier to a paper-based document prior to scanning, other significant benefits can be achieved. For example, all paper-based documents can become self-managing during the image processing cycle from the point of scanning forward. This allows the indexing, scanning, storage, and retrieval processes to be physically and logically isolated. Finally, in the case of pre-printed labels, the nature of the globally unique, document identifier allows the labels to be attached to different types of documents without any predetermined relationship between the document, the document's content, and the pre-printed label. In the most preferred embodiment of the present invention, a dynamically-generated fax cover sheet containing dynamic and static content zones is printed out and used to fax the paper-based document to a central repository for image processing. At least one of the dynamic content zones will contain the globally unique document identifier.

Figure 1:
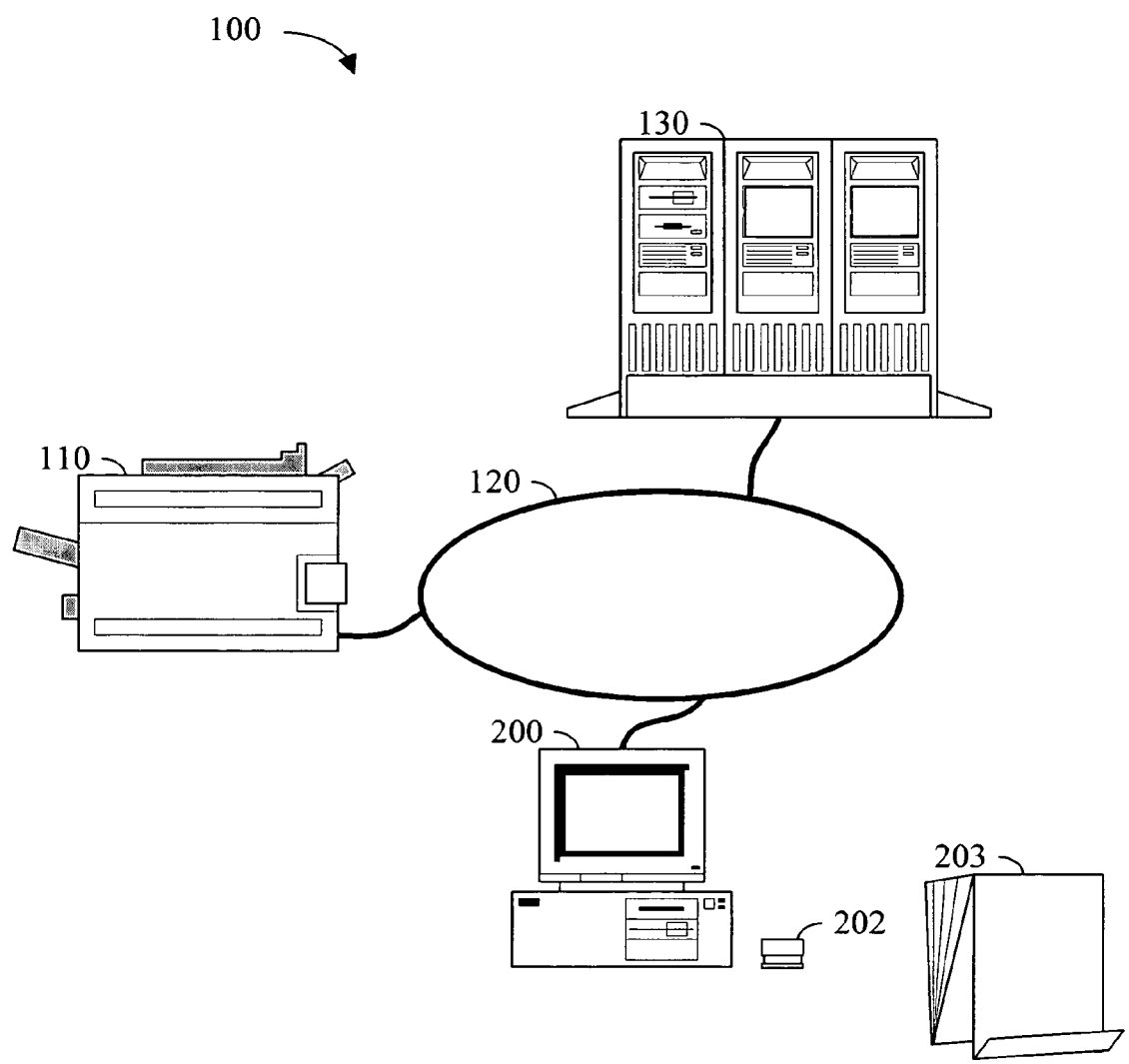
FIG. 1 is a block diagram of a digital filing apparatus for indexing, imaging, storing and retrieving documents according to a preferred embodiment of the present invention.

Referring now to FIG. 1, a digital filing system 100 according to a preferred embodiment of the present invention includes: a computer 200; a desktop label dispenser 202; an optional folding out basket 203; a document input mechanism 110; an image storage mechanism 130; and a communication link 120. Taken together, digital filing system 100 provides a way for office workers to index, store, and manage paper-based documents, regardless of their origin.

Desktop label dispenser 202 is a specialized device which is capable of dispensing pre-printed labels that will typically include a computer readable document identifier and/or bar code along with corresponding human-readable information (i.e., eye-legible content). The document identifiers, which in the most preferred embodiment are pre-printed on labels contained in desktop label dispenser 202, may be implemented as bar codes that conform to some industry accepted bar code standard such as interleaved 2 of 5, code 39, code 138, PDF 417, or other high-density symbology. Alternatively, proprietary or customized bar code symbologies may be employed.

Various label dispensers are further described in conjunction with FIGS. 3b, 3c, 3d, and 3e below. Alternatively, a desktop label printer or a desktop labeling mechanism (shown in FIGS. 3 and 3a) may be employed to print labels on demand. If a desktop label printer or desktop labeling mechanism is used to generate globally unique document identifiers and/or labels containing globally unique document identifiers, it may take the place of desktop label dispenser 202 shown in FIG. 1 and may be connected using any industry standard serial, parallel, or other computer connection. Additionally, in some preferred embodiments of the present invention, desktop label dispenser 202 may be used in conjunction with a desktop label printer or desktop labeling mechanism. The use of a desktop label printer or desktop labeling mechanism is described in conjunction with FIGS. 3 and 3a below. Regardless of the method used to produce the labels, each of the labels will contain a document identifier which is globally unique and which identifies the paper-based document to which the label is applied. A preferred embodiment of a representative label is further described in conjunction with FIGS. 4, 4a, and 4b below.

Folding out basket 203 is an optional accessory that can be effectively utilized with system 100. Folding out basket 203 is provided as a physical desktop storage and staging location, used for indexing paper-based documents, storing paper-based documents, and transporting paper-based documents after they have been indexed and labeled by the user. The paper-based documents can be staged in folding out basket 203 during the day and then transported to a centralized scanning location for batch scanning at pre-determined intervals or on an as-desired basis. Folding out basket 203 is described in greater detail in conjunction with FIG. 11 below. In addition to folding out basket 203, additional system components such as collection and storage boxes/containers may be deployed. These collection and storage boxes may hold paper-based documents stored in multiple folding out baskets 203 and could be used to transport and archive the paper-based documents after they have been imaged using system 100.

Document input mechanism 110 is any type of device which is capable of scanning or imaging a document. For paper-based documents, flatbed scanners, drum scanners, digital copiers, fax machines, multi-function copiers ("mopiers"), etc. are all examples of document input mechanisms 110 which can be used in various embodiments of the present invention. The purpose of document input mechanism 110 is to scan/image a paper-based document and create a computer file that contains a digital image of a paper-based document. This file is then stored on image storage mechanism 130. In addition, digital transmission of e-mail, faxes etc. may also be considered to be various forms of document input mechanism 110. If the document is already a digital image, then there is no need to scan the document, and the image can be stored according to the method described in FIG. 7, 7a, or 7b below.

Image storage mechanism 130 represents large scale secondary storage for storing images which are scanned/imaged by document input mechanism 110. Various components such as hard disk drives, recordable CD-ROM/DVD drives and jukeboxes, magnetic tapes, and other devices known to those skilled in the art may be used to implement image storage mechanism 130. Digital document images captured by document input mechanism 110 may be transmitted to image storage mechanism 130 via communication link 120. Digital document images stored on image storage mechanism 130 may be transmitted to computer 200 via communication link 120. Image storage mechanism 130 may contain removable, transportable, image storage media, such as magneto-optical media, a DVD disk, or a CD-ROM disk.

Communication link 120 is any suitable computer communication link or communication mechanism, including a hardwired connection, an internal or external bus, a connection for telephone access via a modem or high-speed T1 line, infrared or other wireless communications, computer network communications over the Internet or an internal network (e.g. "intranet") via a wired or wireless connection, or any other suitable connection between computers and computer components, whether currently known or developed in the future. It should be noted that portions of communication link 120 may be a dial-up phone connection, broadcast cable transmission line, Digital Subscriber Line, ISDN line, or similar public utility-like access media. Computer 200 is further described in conjunction with FIG. 2 below.

In operation, a paper-based document is received by a user of system 100. The user will use system 100 to index the document. Indexing a document is the process of assigning "meta-data," thereby describing the document and/or the contents of the document, and using the computer to capture the meta-data. The meta-data, or indexing information, is stored in a record in an image index database at the time of indexing. System 100 generates or coordinates a globally unique image document identifier for the paper-based document at the point of indexing. Since system 100 tracks each unique document identifier, it can sequence through a series of pre-programmed document identifiers in a pre-programmed fashion. This sequence will match the sequence of the pre-printed labels exactly. Thus, the user can place a label containing the globally unique document identifier from label dispenser 202 onto the paper-based document. Since system 100 is tracking the document identifiers, the document identifier on the label can be matched to the next sequential document identifier available in system 100.

Since the two document identifiers match, the globally unique document identifier is used to effectively link the document image to the record in the database, facilitating later retrieval of the document image, typically via the indexes. Alternatively, computer 200 communicates with a desktop label printer which generates a label for the paper-based document that contains the globally unique document identifier and any other descriptive information used to identify the document, or uses a desktop labeling mechanism to print the globally unique document identifier directly onto the document. In any case, the software associated with system 100 provides the capability to "auto-increment" the document identifier, automatically creating or synchronizing the next identifier with the next identifier printed on the pre-printed labels.

After the globally unique identifier has been applied to the first page of the paper-based document, the document may be stored in folding out basket 203 until the document is ready to be introduced into system 100 using document input mechanism 110. In some preferred embodiments of the present invention, instead of placing a globally unique identifier on the first page only, a separate identifier may be placed on each page of a paper-based document prior to scanning. When the paper-based document is subsequently scanned, an image of the paper-based document (including the globally unique document identifier) is created and the previously-determined document identifier is extracted. After imaging/scanning, the image of the paper-based document is stored in an image repository in a default storage location, such as on image storage mechanism 130, using the previously generated document identifier as the basis for the image file name for the image, thereby linking the document image to a record in an image index database. In some embodiments of the present invention, the globally unique document identifier will be the file name or will form the basis for creating the file name used in naming the digital image of the paper-based document.

Communication link 120 provides for communication between the various components of system 100 and allows the document image to be transmitted from device to device. In this fashion, a user can quickly and easily gain access to the electronic images of paper-based documents. Examples of communication link 120 include a Local Area Network (LAN), an Intranet, or the Internet. The connection made by communication link 120 may also be wireless. Communication link 120 logically links the physical components of system 100 together, regardless of their physical proximity. This is especially important because in many preferred embodiments of the present invention, it is anticipated that computer 200, document input mechanism 110, and image storage mechanism 130 may be geographically remote and that the indexing process, scanning/imaging process, and storage process will occur in sequential order but will be operationally independent. By labeling the document prior to scanning, and by pre-establishing the image identifier and including the identifier in the label, this method removes the need for any other communication or direct connectivity between the index, scan, and storage processes.

The image of the paper-based document carries the information necessary to link the index, scan, and storage processes, when and as necessary. In addition, by associating or assigning a given group of pre-printed labels containing unique document identifiers to an individual or group of individuals, greater security measures can be afforded to the digital images of the paper-based documents, once the paper-based documents are scanned. By examining the relationship between the identifier extracted from the digital image, "ownership" of the digital image can be established without further human intervention. Access to the digital images can then be controlled, as desired.

While designed primarily to deal with incoming paper-based documents, as mentioned earlier, it is also contemplated that incoming electronic documents (e-mail, documents downloaded from the Internet, etc.) could also be indexed and stored using system 100. In the case of electronic documents, the scanning/imaging of the document would not be necessary. In the case of electronic documents, the label containing the globally unique document identifier could be printed directly onto the lead page of a document. Then, when the document is subsequently scanned, the document identifier can be used to link the image of the document to a database containing the metadata for the document image. This is especially useful in situation such as delivery receipts, where an invoice is generated by a company, sent out for delivery, signed at the point of delivery and then returned to the point of origin for proof of delivery.

Figure 2:
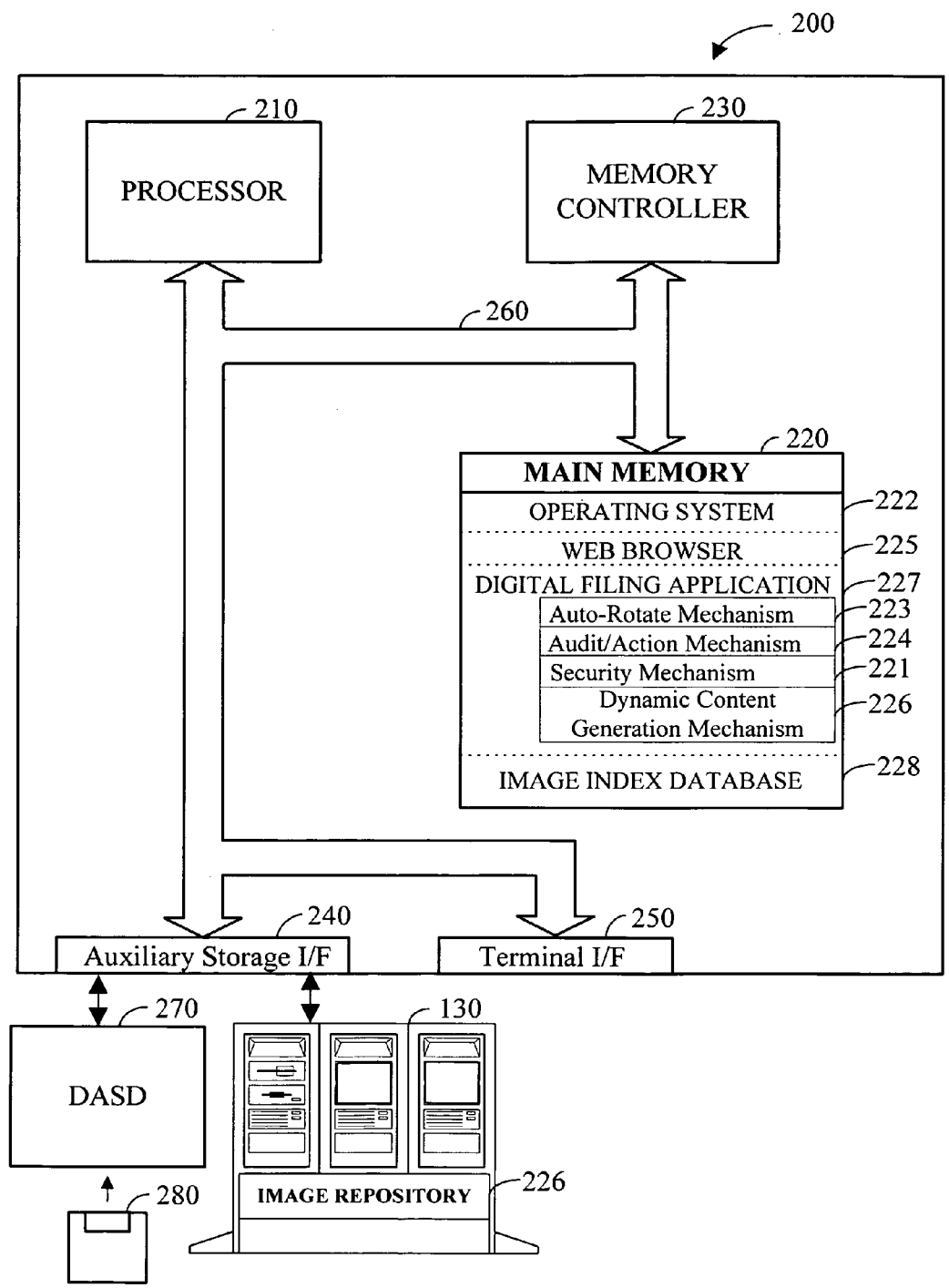
FIG. 2 is a block diagram of a computer suitable for use with the apparatus of FIG. 1.

Referring now to FIG. 2, a computer 200 in accordance with a preferred embodiment of the present invention is an IBM compatible personal computer system. However, those skilled in the art will appreciate that the methods and apparatus of the present invention apply equally to any computer system, regardless of whether the computer system is a complicated multi-user computing apparatus or a single user device such as a personal computer or workstation. Specifically, it is envisioned that a hand-held computer or palm computing device may perform all or substantially all of the functions described in conjunction with computer 200.

Computer 200 suitably comprises at least one Central Processing Unit (CPU) or processor 210, a main memory 220, a memory controller 230, an auxiliary storage interface 240, and a terminal interface 250, all of which are interconnected via a system bus 260. Note that various modifications, additions, or deletions may be made to computer system 200 illustrated in FIG. 2 within the scope of the present invention such as the addition of cache memory or other peripheral devices. For example, computer 200 will also include a monitor or other display device (not shown) connected to the system bus 260. Alternatively, it is anticipated that computer 200 may be a terminal without a CPU that is connected to a network as a network computer (NC). In that case, the responsibilities and functions of CPU 210 will be assumed and performed by some other device on the network. FIG. 2 is not an exhaustive illustration of any specific computer system or configuration, but is presented to simply illustrate some of the salient features of one preferred embodiment for computer system 200.

Processor 210 performs computation and control functions of computer 200, and may comprise a single integrated circuit, such as a microprocessor, or may comprise any suitable number of integrated circuit devices and/or circuit boards working in cooperation to accomplish the functions of a processor. Processor 210 typically executes and operates under the control of an operating system 222 within main memory 220.

Auxiliary storage interface 240 allows computer 200 to store and retrieve information from auxiliary storage devices, such as image storage mechanism 130, magnetic disk drives (e.g., hard disks or floppy diskettes) or optical storage devices (e.g., CD-ROM). One suitable storage device is a direct access storage device (DASD) 270. As shown in FIG. 2, DASD 270 may be a floppy disk drive which may read programs and data from a floppy disk 280. It is important to note that while the present invention has been (and will continue to be) described in the context of a fully functional computer system, those skilled in the art will appreciate that the various mechanisms of the present invention are capable of being distributed as a program product in a variety of forms, and that the present invention applies equally regardless of the particular type or location of signal bearing media used to actually carry out the distribution. Examples of signal bearing media include: recordable type media such as floppy disks (e.g., disk 280) and CD ROMS, and transmission type media such as digital and analog communication links, including wireless communication links.

Memory controller 230, through use of a processor (not shown) separate from processor 210, is responsible for moving requested information from main memory 220 and/or through auxiliary storage interface 240 to processor 210. While for the purposes of explanation, memory controller 230 is shown as a separate entity, those skilled in the art understand that, in practice, portions of the function provided by memory controller 230 may actually reside in the circuitry associated with processor 210, main memory 220, and/or auxiliary storage interface 240.

Terminal interface 250 allows system administrators and computer programmers to communicate with computer system 200, normally through programmable workstations. Although computer 200 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports bi-directional communication in a computer-related environment could be used.

Main memory 220 suitably contains an operating system 222, a web browser 225, a digital filing application 227; and an image index database 228. The term "memory" as used herein refers to any storage location in the virtual memory space of computer 200. It should be understood that main memory 220 will not necessarily contain all parts of all mechanisms shown. For example, portions of operating system 222 may be loaded into an instruction cache (not shown) for processor 210 to execute, while other files may well be stored on magnetic or optical disk storage devices (not shown). In addition, although image index database 228 is shown to reside in the same memory location as operating system 222, it is to be understood that main memory 220 may consist of multiple disparate memory locations.

Operating system 222 includes the software which is used to operate and control computer 200. Operating system 222 is typically executed by processor 210. Operating system 222 may be a single program or, alternatively, a collection of multiple programs which act in concert to perform the functions of any typical operating system, which functions are well known to those skilled in the art.

Web browser 225 can be any web browser software application currently known or later developed. Examples of suitable web browsers 225 include Microsoft Internet Explorer and Netscape Navigator. It is anticipated the other vendors will develop web browsers that will be suitable for use with the various preferred embodiments of the present invention.

Image repository 226 can be any type of computer filing or storage structure known to those skilled in the art. In the most preferred embodiments of the present invention, image repository 226 is simply a directory or subdirectory or a series of directories or subdirectories containing a series of images where each image has a globally unique document identifier, taken from the pre-printed labels or, alternatively, created and assigned as explained below in conjunction with FIGS. 5 and 6. In one preferred embodiment of the present invention, image repository 226 may be a Structured Query Language (SQL) compatible database file capable of storing records containing images. In another preferred embodiment of the present invention, image repository 226 is an image directory on a DVD or CD-ROM disk which can be easily transported from one geographic location to another.

In one preferred embodiment of the present invention, digital filing application 227 works in conjunction with web browser 225 to provide the various functions of the present invention including a user interface and indexing tools used to prepare a document for subsequent scanning/imaging and electronic filing. Alternatively, digital filing application 227 may be a stand-alone program product which does not use web browser 225 for additional functionality and operates over an office intranet, in conjunction with any typical network operating system such as Windows NT.

Digital filing application 227 also incorporates standard database management tools to provide record management capabilities (add, modify, delete, etc.) for image repository 226 and image index database 228 and various administrative utilities. In addition, as shown in FIG. 2, digital filing application 227 also incorporates an auto-rotate mechanism 223 an audit/action mechanism 224, and a security mechanism 221. Auto-rotate mechanism 223 is discussed in conjunction with FIG. 14 and audit/action mechanism 224 is discussed in conjunction with FIG. 15.

Preferably, image index database 228 is a Structured Query Language (SQL) compatible database file capable of storing information, including indexed document names, for the images stored in image repository 226. In addition, image index database 228 may be physically located in a location other than main memory 220. For example, image index database 228 may be stored on an external hard disk drive (not shown) coupled to computer 200 via auxiliary storage I/F 240. Alternatively, image repository 226 and image index database 228 may each be stored at different remote locations which are accessible via the Internet, by utilizing web browser 225.

It should be noted that an image or images from image repository 226 may be loaded into main memory 220 and/or a cache memory storage location (not shown) for viewing by digital filing application 227 and/or web browser 225. As is typical for web browsers, previously viewed images may be recalled by using a "back" or "forward" button. Since the present invention works with standard web browsers, this functionality will be available for images viewed using digital filing application 227. If a web browser is not utilized, any other standard image viewer may be employed. Since the images will be stored using industry standard formats such as portable document format (PDF) or tagged image file format (TIFF), those skilled in the art will recognize that there are many options for viewing images, including readily available system software and viewers that can be downloaded from the internet. In addition, the use of PDF and TIFF is not exhaustive, it is anticipated that various types of image formats may be used in various preferred embodiments of the present invention. The most preferred embodiments of the present invention also use the header of the digital image file to store index information related to the digital image. In this fashion, a complete restoration of image index database 228 can be reconstructed from image repository 226.

Figure 3:
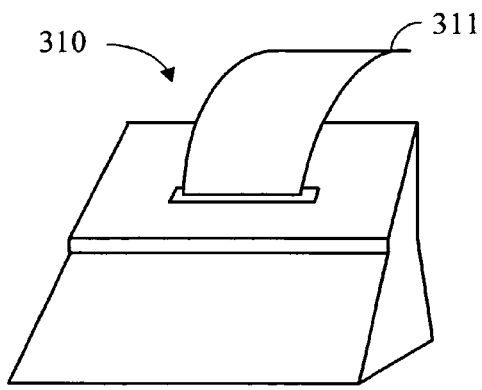
FIG. 3 is a perspective view of a desktop document label printing mechanism according to a preferred embodiment of the present invention.

Referring now to FIG. 3, a desktop label printer 310 according to a preferred embodiment of the present invention is shown. In a first preferred embodiment, desktop label printer 310 generates a bar code and eye-legible information on linerless label stock 311. Linerless label stock 311 can then be separated into individual labels that are subsequently applied by hand to a paper-based document which is to be scanned and stored using system 100 of FIG. 1. In an alternative preferred embodiment of the present invention, desktop label printer 310 is a standard printer and prints an entire document, with bar coded information contained on the printed document. This is especially useful when a company or organization is preparing paper-based documents which will be written upon and imaged at a later date. For example, if a company prints an invoice with a globally unique document identifier printed on it, the invoice can be sent out with a delivery driver, signed, and then returned to the company. After receipt, the paper-based invoice can be scanned using system 100 and the invoice will be automatically filed using the methods of the present invention.

Figure 3A:
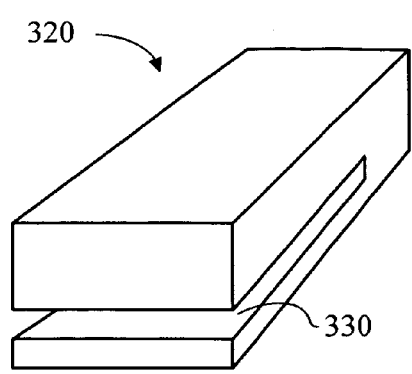
FIG. 3a is a perspective view of a desktop document labeling mechanism according to a preferred embodiment of the present invention.

Referring now to FIG. 3a, a preferred embodiment of a desktop labeling mechanism 320 prints and applies a label directly onto the paper-based document (like an electronic stapler). As shown in FIG. 3a, desktop labeling mechanism 320 has an opening 330 for receiving paper-based documents or pages of a paper-based document. The user can insert the paper into opening 330 and desktop labeling mechanism 320 will apply the printed label directly to the paper. In yet another alternative preferred embodiment of desktop labeling mechanism 320, the label information (bar code and eye-legible content) is printed directly on the paper-based document without using a separate label. The content of the bar code and eye-legible information for all of the labels described in conjunction with FIGS. 3, 3a, 3b, 3c, 3d, 3e, 4, 4a, 4b, 4c, and 4d is discussed in conjunction with FIGS. 5, 6, and 6a below.

Figure 3B:
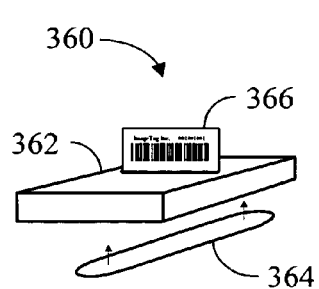
FIG. 3b is a perspective view of a desktop label dispenser for dispensing pre-printed labels according to a preferred embodiment of the present invention.

Referring now to FIG. 3b, a desktop label dispenser 360 for dispensing pre-printed labels in accordance with a preferred embodiment of the present invention includes: a label containing portion 362; a selectively removable adhesive attachment portion 364; and a pad of pre-cut, individual, pop-up labels 366. Label dispensing portion 312 dispenses individual labels from pad 366 one at a time in a pop-up fashion. A single pop-up label 420 from a typical pad of pop up labels 366 is shown in FIG. 4b. FIG. 4c shows a side view of a pad of pop-up labels 366. In the most preferred embodiments of the present invention, selectively removable adhesive attachment portion 364 is a piece of double stick tape or other suitable mechanism for affixing label containing portion 362 to a desk top or other similar surface.

Figure 3C:
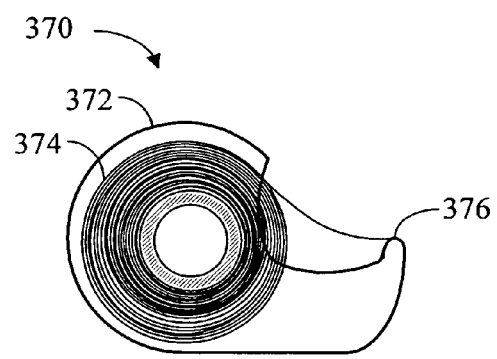
FIG. 3c is a side view of a desktop label dispenser for dispensing pre-printed labels according to an alternative preferred embodiment of the present invention.

Referring now to FIG. 3c, a desktop label dispenser 370 for dispensing labels in accordance with an alternative preferred embodiment of the present invention includes: a case portion 372; a roll of linerless labels 374; and a cutting edge 376. When using dispenser 370 to dispense individual labels from roll of labels 374, the user grasps the free end of roll of labels 374 and uses cutting edge 376 to separate a single label from roll of labels 374. In use, this is very similar to the action used to dispense a piece of clear plastic tape from a standard tape dispenser.

Figure 3D:
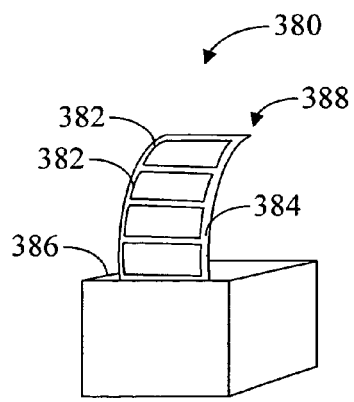
FIG. 3d is a perspective view of a desktop label dispenser for dispensing pre-printed labels according to an alternative preferred embodiment of the present invention.

Referring now to FIG. 3d, a desktop label dispenser 380 for dispensing labels in accordance with an alternative preferred embodiment of the present invention includes: a box portion 386 and a roll of labels 388. Roll of labels 388 comprises a backing liner 384 and a series of individual pre-cut, pre-printed labels 382. Box portion 386 is used to store and dispense individual pre-cut, pre-printed labels 382 from roll of labels 388.

Figure 3E:
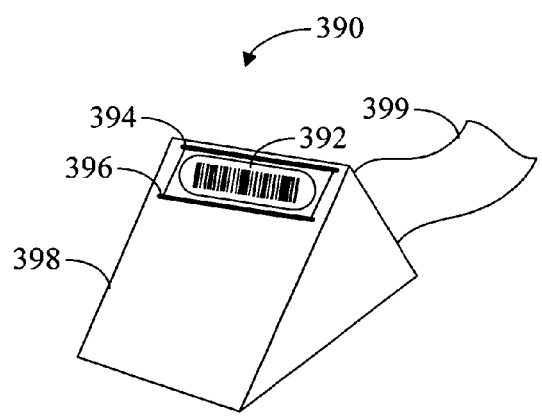
FIG. 3e is a perspective view of a desktop label dispenser for dispensing pre-printed labels according to an alternative preferred embodiment of the present invention.

Referring now to FIG. 3e, a desktop label dispenser 390 for dispensing labels in accordance with an alternative preferred embodiment of the present invention includes: a label-containing portion 398; a dispensing slot 396; a take-up slot 394; and a roll of individual, pre-cut, pre-printed labels 392 placed on backing liner 399. In use, label-containing portion 398 contains roll of labels 392 and backing liner 399 is fed first through dispensing slot 396 and then through take-up slot 392. This allows a user to grasp backing liner 399 with their hand and pull backing liner 399. As backing liner 399 is pulled, a single label 392 is displayed between dispensing slot 396 and take-up slot 394. The user can remove displayed label 392 from backing liner 399 and place it onto a document.

Figure 4:

Referring now to FIG. 4, a sample label 400 generated by desktop labeling mechanism 202 is illustrated. As shown in FIG. 4, label 400 contains two separate portions, an eye-legible information portion 410 and a computer readable bar code portion 420. Eye-legible information portion 410 is provided as a convenience for the user of system 100 and provides basic information about a paper-based document or about how a given paper-based document is to be processed. Computer readable portion 420 is used to contain, transport, and store the document identifier to be used when the scanned image is stored on image storage mechanism 130 of FIG. 1.

While the information contained in these two different portions may be identical, for security reasons the information in these two different portions may be different. It should be noted that the use of typical bar code symbology to encode the document identifier anticipates the use of many different types of symbologies. This includes those symbologies that represent digital information as shading within an icon (2d bar code symbologies) or any other symbology capable of representing large quantities of information in a digital format. In many preferred embodiments, the preprinted document identifier will simply be a globally unique number represented in a traditional bar code symbology such as Interleaved 2 of 5 or code 39. Also note that the bar code or machine readable portion of the label may include additional information, besides the document identifier to be used when storing the digital image of the paper-based document. For example, information on document disposition or additional index data for the document may be contained in the bar code.

Figure 4A:
FIG. 4a is a typical label dispensed by the desktop label dispensers of FIGS. 3c, 3d, and 3e.
Figure 4B:
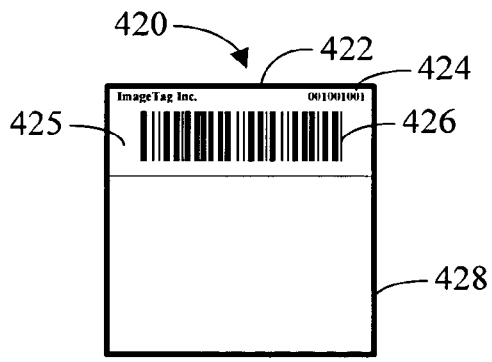
FIG. 4b is a typical label dispensed by the desktop label dispensers of FIG. 3b.
Figure 4C:
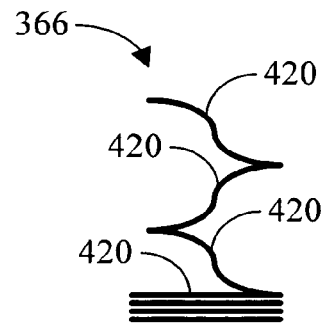
FIG. 4c is a side view of a pad of pre-printed labels dispensed by the dispenser shown in FIG. 3b.

Referring now to FIG. 4a, a sample pre-printed label 410, typical of the type of labels dispensed from desktop label dispensers 370, 380, and 390 is shown. Desktop label dispensers 370, 380, and 390 dispense individual labels from a roll of sequentially numbered labels. As with the label shown in FIG. 4, typical label 410 contains two separate portions, an eye-legible information portion 412 and a computer readable bar code portion 414.

The most preferred embodiments of pre-printed labels used in conjunction with the present invention utilize the Interleaved 2 of 5 bar code symbology to represent the document identifier for a digital image to be created in the future. When using preprinted labels, digital filing application 227 is synchronized with the bar-coded numbers on the pre-printed labels. Digital filing application 227 allows a user of system 100 to easily increment or decrement the numbers used as document identifiers to maintain synchronization, in case a user accidentally destroys a label. Since the preprinted bar-coded numbers on the labels are sequential, once digital filing application 227 has been synchronized with the first pre-printed label, the numeric document identifiers created by digital filing application 227 and numbers on the pre-printed labels advance in lock-step sequence. Once a roll or pad of labels has been expended, a new roll or pad of labels can be loaded and synchronized with digital filing application 227 once again.

Referring now to FIG. 4b, a typical pre-printed label 420, dispensed by desktop label dispenser 360 (shown in FIG. 3) is shown. Label 420 is typical of a single label dispensed from pad 366, as shown in FIG. 4c. As shown in FIG. 4b, label 420 contains an eye-legible information portion 424 and a computer readable bar code portion 426 printed on an acetate or similar film product 422. Label 420 most preferably comprises an opaque portion 425 and a clear portion 428. Eye-legible information portion 424 and a computer readable bar code portion 426 are printed on opaque portion 425. In the most preferred embodiments of the present invention, the surface of clear portion 428 is suitable for writing upon. This allows the user to make comments regarding the paper-based document to which it is attached.

Referring now to FIG. 4c, pad 366 is composed of a series of individual labels 420. The individual labels 420 are joined together by an adhesive such that they form a fan-fold configuration. When the user pulls a first label 420 from dispenser 360, the next label 420 is pulled into the dispensing position by the force of removing the first label 420, in a pop-up fashion. Similarly, when the second label 420 is pulled from dispenser 360, the third label 420 is pulled into the dispensing position. In this fashion, each of the individual labels 420 in pad 366 can be dispensed one at a time and applied to documents.

Figure 4D:
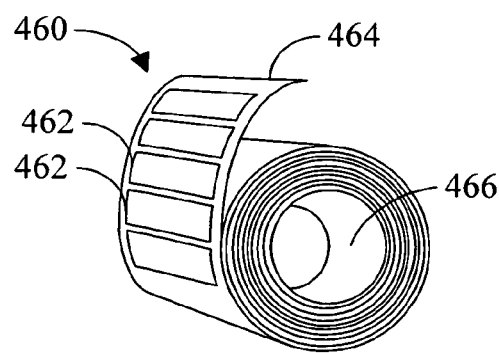
FIG. 4d is a perspective view of a roll of pre-printed labels dispensed by the dispensers shown in FIGS. 3d and 3e.

Referring now to FIG. 4d, an alternative preferred embodiment for a roll of individual pre-printed labels 460 is shown. Roll 460 is typical of the type of labels which could be dispensed from label dispensers 380 and 390. Roll 460 comprises a backing liner 464 and a series of individual pre-printed, pre-cut labels 462 wound on an optional core 466. Optional core 466 is used to provide stability for roll 460 during the dispensing operation and may be sized as required. Labels 462 may be printed on any suitable pressure sensitive adhesive backed paper. Labels 462 may utilize a repositionable adhesive or a permanent adhesive, depending on the application requirements.

Figure 5:
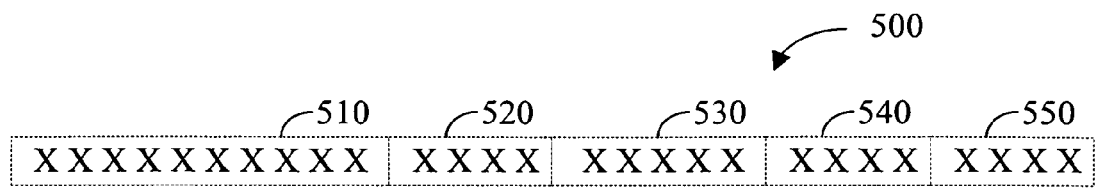
FIG. 5 is a generic illustration of a document naming and labeling convention according to a preferred embodiment of the present invention.

Referring now to FIG. 5, a generic description of the content of a label 500 according to a preferred embodiment of the present invention is described. As shown in FIG. 5, label 500 includes a unique document number, which can be used to relate the scanned image to the image file name or which can become the actual image file name after the document is scanned and may include the following components: a software serial number field 510; a security field 520; an indexing date field 530; a UserID field 540; and a document counter field 550. Software serial number field 510 is used to identify a unique customer. It is anticipated that each copy of the software program product which provides the features of the present invention will have a unique serial number associated with it. This will provide a unique code to identify each user of a system 100 that, when concatenated with the other numbers, will guarantee that each document number will be globally unique. This is important because it is anticipated that third party vendors will be providing storage space for images and vendors must have a reliable method of uniquely identifying, segregating, securing, and storing images from multiple clients. One alternative preferred embodiment of the present invention will use the serial number or a unique customer identification number to identify each client in a database over the Internet.

When using pre-printed labels, individual users of system 100 will be assigned ranges of numbers and no pre-printed labels will provide duplicate numbers. Alternatively, different symbologies can be used by different users, and the numbers from one symbology can thereby be distinguished from identical numbers created using a different symbology. In the case of pre-printed numbers, the only piece of information that will be printed on the label will be the numeric document identifier. The other information shown in FIG. 5 can still be stored in image index database 228 and accessed by referencing the unique document identifier contained in a label.

Security field 520 is used to provide various security features, such as a user-established code to ensure that document numbers are established under the control or security of the company that owns the documents. In addition, security field 520 can customized and configured to provide internal security measures, thereby limiting access to sensitive document images. Indexing date field 530 provides the date that the document was indexed by the user of system 100. UserID field 540 is used to identify the user who indexed the document for storage. The identity of the user is typically determined by the system via logon ID. Document counter field 550 is used to track the number of documents indexed by a user on a given date.

Figure 6:
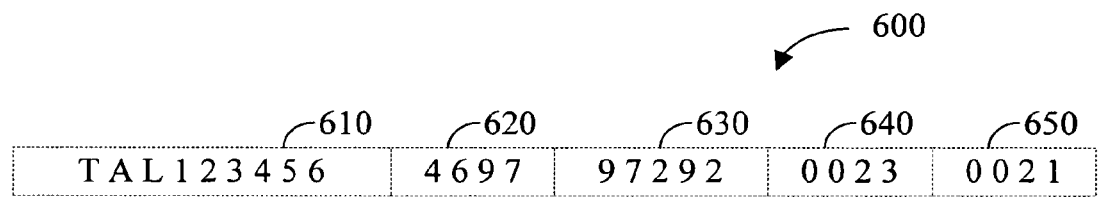
FIG. 6 is a specific illustration of a document naming and labeling convention according to a preferred embodiment of the present invention.

Referring now to FIG. 6, a specific example of a label 600 with field components corresponding to FIG. 5 is illustrated. As shown in FIG. 6, software serial number field 610 contains "TAL123456." This identifies a specific customer and can pinpoint the licensed digital filing application software that issued that specific document number. As shown in FIG. 6, security field 620 contains a security code "4697" which describes a user-defined security aspect for accessing this particular document. Indexing date field 630 contains "97292" which is the Julian date representation for the date of the indexing session (i.e., Oct. 19, 1997). UserID field 640 contains the user identification number "0023. This indicates that user 0023 is the user who indexed the document. Document counter field 650 contains "0021" which indicates that this particular label is being generated for the 21$^{st}$ document indexed on this date by this user. To create an image storage file name, a file name extension is appended to the number shown in FIG. 6. To accommodate image file formats and conventions that require unique file names for each individual page of a multi-page document, an optional page-numbering field may also be appended to the number shown in FIG. 6. In addition, other fields for other purposes may also be added. It is contemplated that various additional fields will be developed for specific processing environments.

Figure 6A:
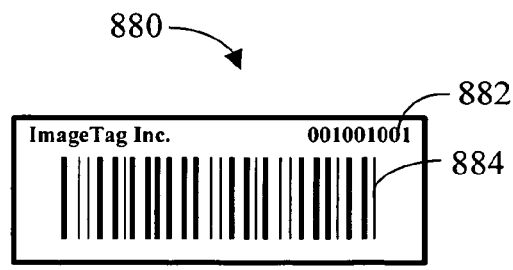
FIG. 6a is a specific illustration of a label according to a preferred embodiment of the present invention.

Referring now to FIG. 6a, a specific example of a simplified label 880 is illustrated. As shown in FIG. 6a, eye-legible portion 882 contains the numeric value 001001001. This numeric value is actually the same as the bar-coded number represented in bar code portion 884. In this embodiment, only the number contained in eye-legible portion 882 and bar code portion 884 is used as the unique document identifier for the digital image of the paper-based document to which label 880 is attached.

Figure 7:
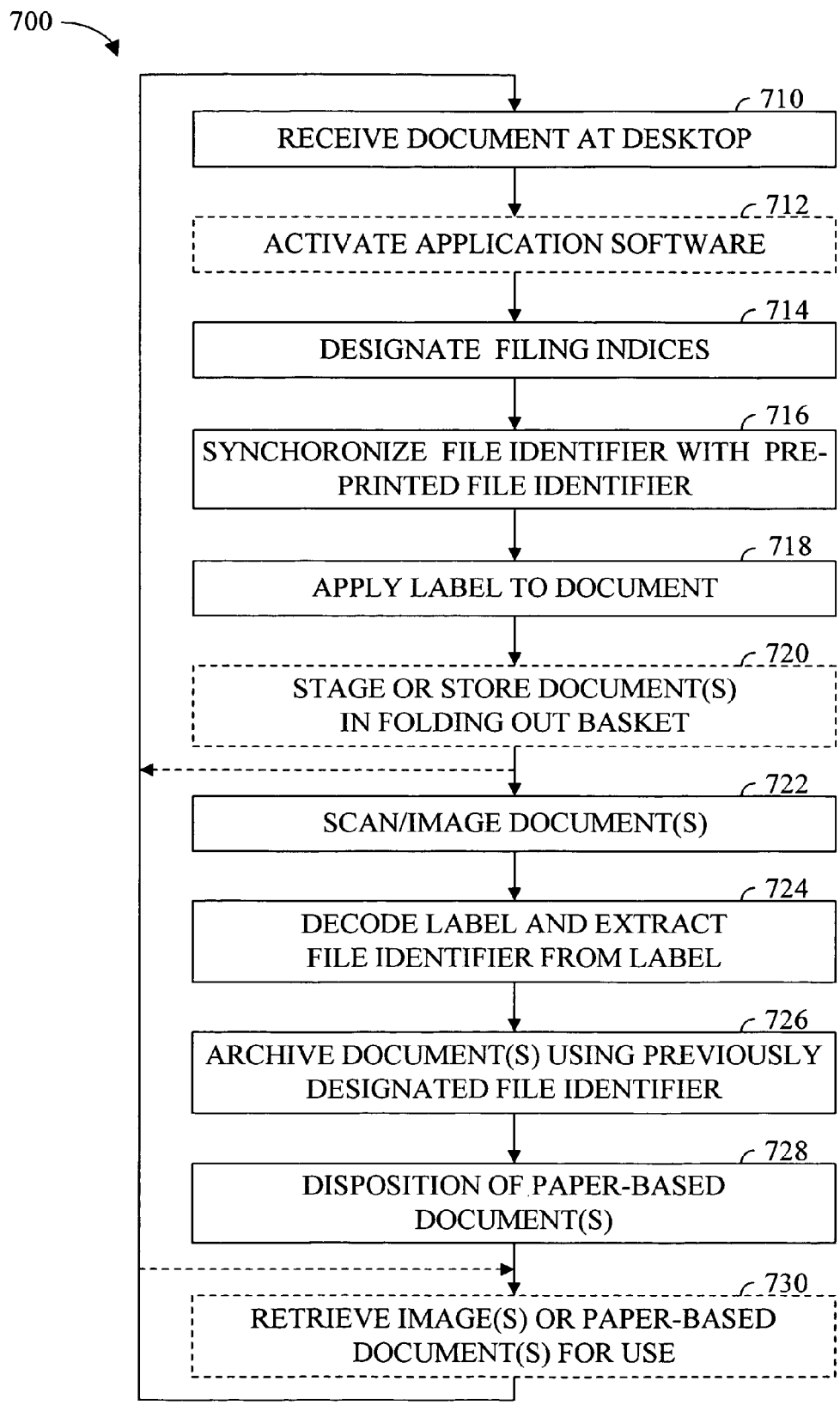
FIG. 7 is a flow chart for processing paper-based documents according to a preferred embodiment of the present invention.

Referring now to FIG. 7, a method 700 for processing documents according to a preferred embodiment of the present invention is illustrated. As shown in FIG. 7, the method begins when a document arrives at a user's desktop (step 710). When the user is ready to index the document, the user will activate digital filing application 227 to index documents (step 712). This step is shown as an optional step because the user may have activated the software prior to the arrival of the document at the desktop. While digital filing application 227 may be a stand-alone software package, in an alternative preferred embodiment, digital filing application 227 is a web browser-based program that, when invoked, automatically launches a web browser such as Microsoft Internet Explorer and works directly with the web browser software to index, label, and retrieve documents. Digital filing application 227 may also be implemented as a JAVA applet or a plug-in for a web browser that is activated from within the web browser.

After activating digital filing application 227, the user can access the user interface and designate the filing parameters, processes, and indices for the document being indexed (step 714). The filing parameters can include the location where the digital image should be stored as well as meta-data describing the document to categorize the document contents for later searching and retrieval. In addition, the indexing operation may include the step of indicating processing instructions for the digital image of the paper-based document. These processing instructions may include items such as "e-mail" a document image, or an instruction to export the digital image and the related index information to another software program. These processing instructions are stored in image index database 228 and "suspended" until such time as the paper-based document is scanned. Once the document has been scanned, the unique document identifier is used to locate the correct record in image index database 228 and the appropriate processing instructions can be executed. It should be noted that the physical storage location of image index database 228 and/or image repository 226 may be a local hard drive on the user's computer system, a network storage device at the user's location, or some storage location in a physically and/or geographically different location. Any storage location accessible by system 100 may be used. This is especially important for Intranet and Internet applications. By storing images in a remote location, automatic backup and security features may be easily implemented.

Next, digital filing application 227 will identify the globally unique document identifier which will eventually be used to create the image file name for the document (step 716) according to the conventions illustrated above in FIG. 5, 6, or 6a. In the case of pre-printed labels, digital filing application 227 is synchronized with the pre-printed labels and the image file name generated by digital filing application 227 is the next bar-coded number in sequence on the next pre-printed label. In the case of pre-printed labels, the label is retrieved from a desktop label dispenser and applied to the document (step 718). In addition to acting as the document identifier for the document, the document identifier is used to create a database record with the filing indices and filing instructions and use the label to match the digital image of the paper-based document with the appropriate filing indices and instructions.

As explained earlier, a label may also be generated by desktop labeling mechanism 202 and subsequently applied to the document by the user or applied directly to the document by desktop labeling mechanism 202. Regardless of how the label is generated for this labeling process, a user tells system 100 how to file the document and the filing instructions are "tagged" onto the document. Regardless of whether the label is pre-printed or printed on demand, once a document has been tagged or labeled, the document is inventoried and becomes linked to system 100 as an intelligent, self-managing document.

After the document has been indexed and labeled, the document can optionally be stored in a folding out basket, awaiting subsequent scanning/imaging (step 720). Next, the paper-based document is scanned or imaged using a scanning sub-system (step 722), thereby creating an electronic image of the document. After the scanning process, the label is decoded by the scanning sub-system and the previously created/issued document identifier is extracted from the label (step 724). The process of decoding the label and extracting the document identifier from the label can be accomplished by many different methods. The most preferred embodiments of the present invention uses a method whereby the image of the paper-based document is used to generate a bit mapped image for processing. The bit map is searched for data blocks which are candidates for bar codes. Each of the data blocks are then processed to determine the content of each unique object within the data block. One variation of this specific methodology is described in significant detail in U.S. Pat. No. 5,557,091, which patent is incorporated herein by reference. Those skilled in the art will recognize that there are numerous other, similar methods which may suitably be employed. The actual method used is not as important as the ability of the method to accurately and reliably decode the digital image and extract the file identifier from the digital image of the paper-based document.

Using the instructions associated with the label, the document image is electronically processed and may be archived in a specified location on image storage mechanism 130, using the previously created document identifier (step 726). In addition, the actual stored name may also include an appended file name extension such as .tif or .pdf to identify the type of image that has been stored. The filing indices and the filing instructions for the paper-based document are either contained in the bar code or in a database record that is identified by the document identifier printed on the pre-printed label which is, in turn, attached to a paper-based document. Regardless of how the label is generated, the globally unique identifier printed on the label is used to connect the digital image of the paper-based document to the indices and processing information for the related paper-based document. The document identifier that is extracted from the label may be used as the name of the file directly or, alternatively, used as part of the ultimate file name or, as an index into a database that contains the actual file names.

Operational rules, color-coded out baskets, eye legible label content or other user-determined methods will determine the disposition of the original paper-based document (step 728) after scanning (e.g. return in out basket to originator, file centrally, destroy, etc.) After image storage, the document image can optionally be retrieved (step 730) by the user for review, printing, editing, etc. In addition, the paper-based document can be retrieved (step 730) using a document organization schema, if the paper-based document has been retained. As shown by the dashed arrow lines in FIG. 7, a user can repeat the indexing and labeling process for additional paper-based documents and then batch scan the staged documents all at once. In addition, step 730 can be repeated for as many documents or document images as desired.

To retrieve the document image, the user will invoke digital filing application 227 separately or in conjunction with web browser 225 and employ the user interface to select the desired document image. Digital filing application 227 references image index database 228 and uses the unique document number previously created for the desired document image to locate the document image in image repository 226. This is also the same number that is printed on the label that was applied to the paper document. Digital filing application 227 and/or web browser 225 will use the file name extension (.tif or .pdf, for example) of the image to identify the software support necessary to display the image. The software support for image display, faxing, printing, integration, etc. can be provided directly by digital filing application 227 or web browser 225 or, alternatively by web browser 225 invoking other, supporting $3^{rd}$ party application software programs as necessary. As suggested by the arrows in FIG. 7, this process can be repeated for each and every document that the user receives, if desired.

A system setup allows the user to specify the default location for image repository 226 such as a main system secondary storage location, a centralized storage location, or a third party storage location. In addition, when system 100 is initially installed, the system parameters can be set to work with images in any standard image file format, such as TIFF or PDF. Additionally, the scanning/imaging software can be configured to output any standard image file format and to use a default scan mode, such as TIFF. Although system 100 is originally configured with various defaults, the user can override the defaults and optionally select a different image format for scanning/imaging documents and/or storing document images. If desired, system 100 will automatically write an appropriate file name extension according to the image file format selected by the user, or the default file format where no override is exercised by the user.

Figure 7A:
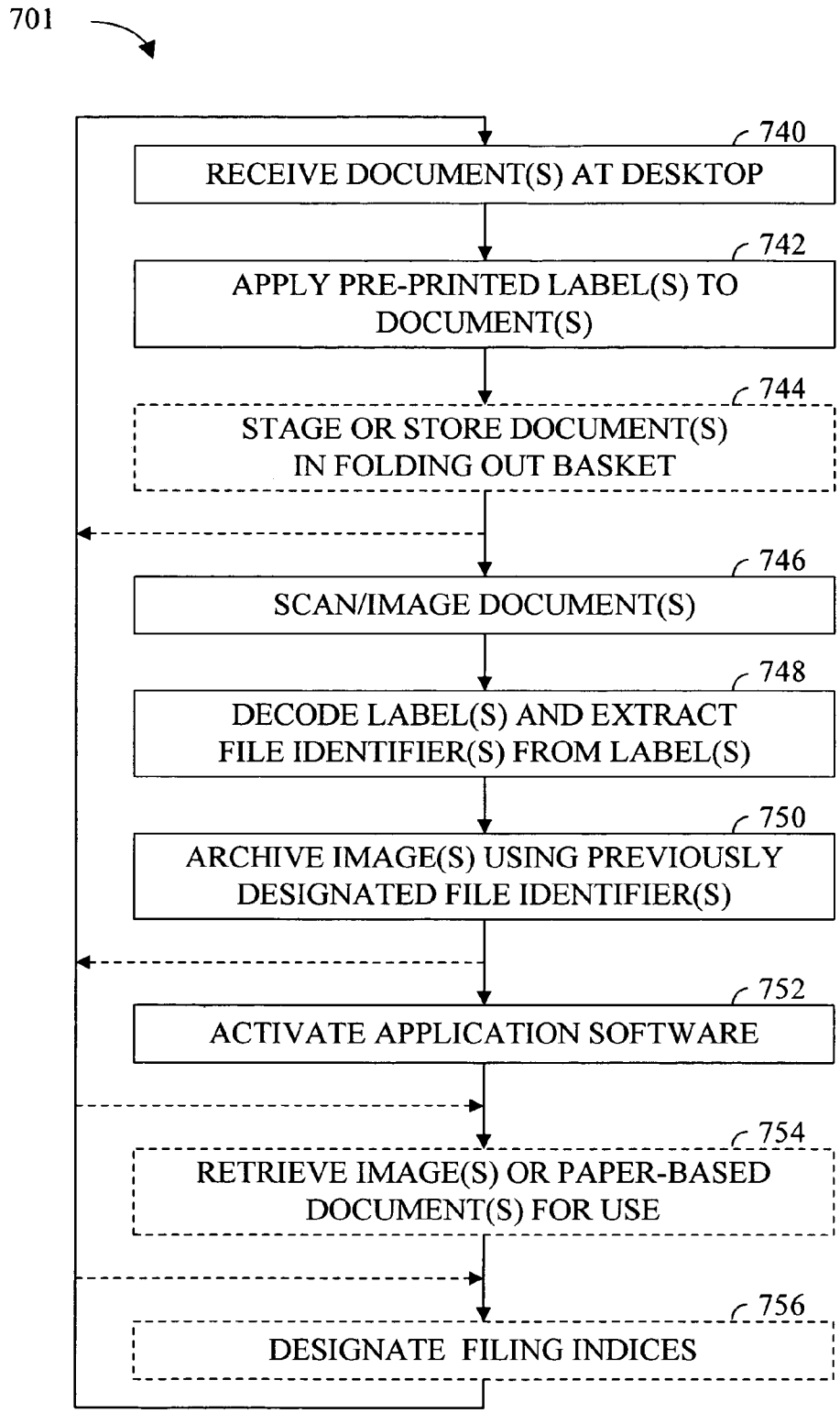
FIG. 7a is a flow chart for processing paper-based documents according to an alternative preferred embodiment of the present invention.

Referring now to FIG. 7a, a method 701 for processing documents according to an alternative preferred embodiment of the present invention is illustrated. As shown in FIG. 7, the method begins when a document arrives at a user's desktop (step 740). Unlike the previous implementation, the user will typically apply labels to the document(s) (step 742), prior to indexing the document. Of course, the user may index the document and then apply the label, so long as the unique identifier on the label is synchronized with the unique identifier for that document in system 100. As explained above, the label may be generated by the system software and printed directly on the document by a desktop labeling mechanism, printed on label stock on a "demand" basis and then placed on the document, or may simply be extracted from a desktop labeling dispenser and applied to the document. Regardless of how the label is generated, it will contain a unique document identifier that is synchronized with a record in image index database 228 that is related to the paper-based document that the label has been placed on.

After the document has been labeled, the document can optionally be stored in a folding out basket, awaiting subsequent scanning/imaging (step 744). Next, the paper-based document is scanned or imaged using a scanning sub-system (step 746), thereby creating an electronic image of the document. After the scanning process, the bar code portion of the label is decoded by the scanning sub-system and the previously issued/created document identifier is extracted from the bar code (step 748). Using the instructions printed on or associated with the label, the document image is electronically archived in a specified location on image storage mechanism 130, using the previously created document identifier (step 750). In addition, the actual stored name may also include an appended file name extension such as .tif or .pdf to identify the type of image that has been stored. As discussed above, since the pre-printed labels and the associated document identifier can be associated or assigned to specific individuals, the digital images of the paper-based documents can be sorted and routed to the correct owner without further human intervention. As explained below in conjunction with step 756, filing indices and processing instructions can be applied to the digital images at a later time. In addition, this allows for centralized control and administration of all document identifiers, where ever they may be physically located. Indeed, in one preferred embodiment of the present invention, all document identifiers are managed by a single database and all document identifiers are assigned and controlled from a single location.

When the user is ready to index the previously tagged and scanned document, the user will activate digital filing application 227 to index documents (step 752). While digital filing application 227 may be a stand-alone software package, in an alternative preferred embodiment, digital filing application 227 is a web browser-based program that, when invoked, automatically launches a web browser such as Microsoft Internet Explorer and works directly with the web browser software to index, label, and retrieve documents. Digital filing application 227 may also be implemented as a JAVA applet or a plug-in for a web browser.

After activating digital filing application 227, the user can access the record for the digital image of the paper-based document (step 754) to review, print, and/or designate additional filing parameters and indices for the document being viewed (step 756). It should be noted that the physical storage location of image index database 228 and/or image repository 226 may be a local hard drive on the user's computer system, a network storage device at the user's location, or some storage location in a physically and/or geographically different location. Any storage location accessible by system 100 may be used. This is especially important for Intranet and Internet applications. By storing images in a remote location, automatic backup and security features may be easily implemented.

As before, digital filing application 227 creates or assigns the document identifier which will eventually be used to create the image file name for the document according to the conventions illustrated above in FIGS. 5, 6, and 6a. Alternatively, in the case of pre-printed labels, digital filing application 227 is synchronized with the pre-printed labels and the image file name generated by digital filing application 227 is the next bar-coded number in sequence on the next pre-printed label. Regardless of whether the label is pre-printed or printed on demand, once a document has been tagged or labeled, the document is inventoried and becomes linked to system 100 as an intelligent, self-managing document.

As shown by the dashed arrow lines in FIG. 7a, a user can repeat the retrieval and indexing processes for as many additional paper-based documents or document images as desired. To retrieve the document image, the user will invoke digital filing application 227 separately or in conjunction with web browser 225 and employ the user interface to select the desired document image. Digital filing application 227 references image index database 228 and uses the unique document name/identifier previously created for the desired document image to locate the document image in image repository 226. This is referenced by the name/identifier that is printed on the label that was applied to the paper document. Digital filing application 227 and/or web browser 225 will use the file name extension (.tif or .pdf, for example) of the image to identify the software support necessary to display the image. The software support for image display, faxing, printing, integration, etc. can be provided directly by digital filing application 227 or web browser 225 or, alternatively by web browser 225 invoking other, supporting application software programs as necessary. As suggested by the arrows in FIG. 7a, this process can be repeated for each and every document that the user receives, if desired.

As explained above, a system setup allows the user to specify the default location for image repository 226 such as a main system secondary storage location or a third party storage location. In addition, when system 100 is initially installed, the system parameters can be set to work with images in any standard image file format, such as TIFF or PDF. Additionally, the scanning/imaging software can be configured to output any standard image file format and to use a default scan mode, such as TIFF. Although system 100 is originally configured with various defaults, the user can override the defaults and optionally select a different image format for scanning/imaging documents and/or storing document images. System 100 will automatically write an appropriate file name extension according to the image file format selected by the user, or the default file format where no override is exercised by the user.

Figure 7B:
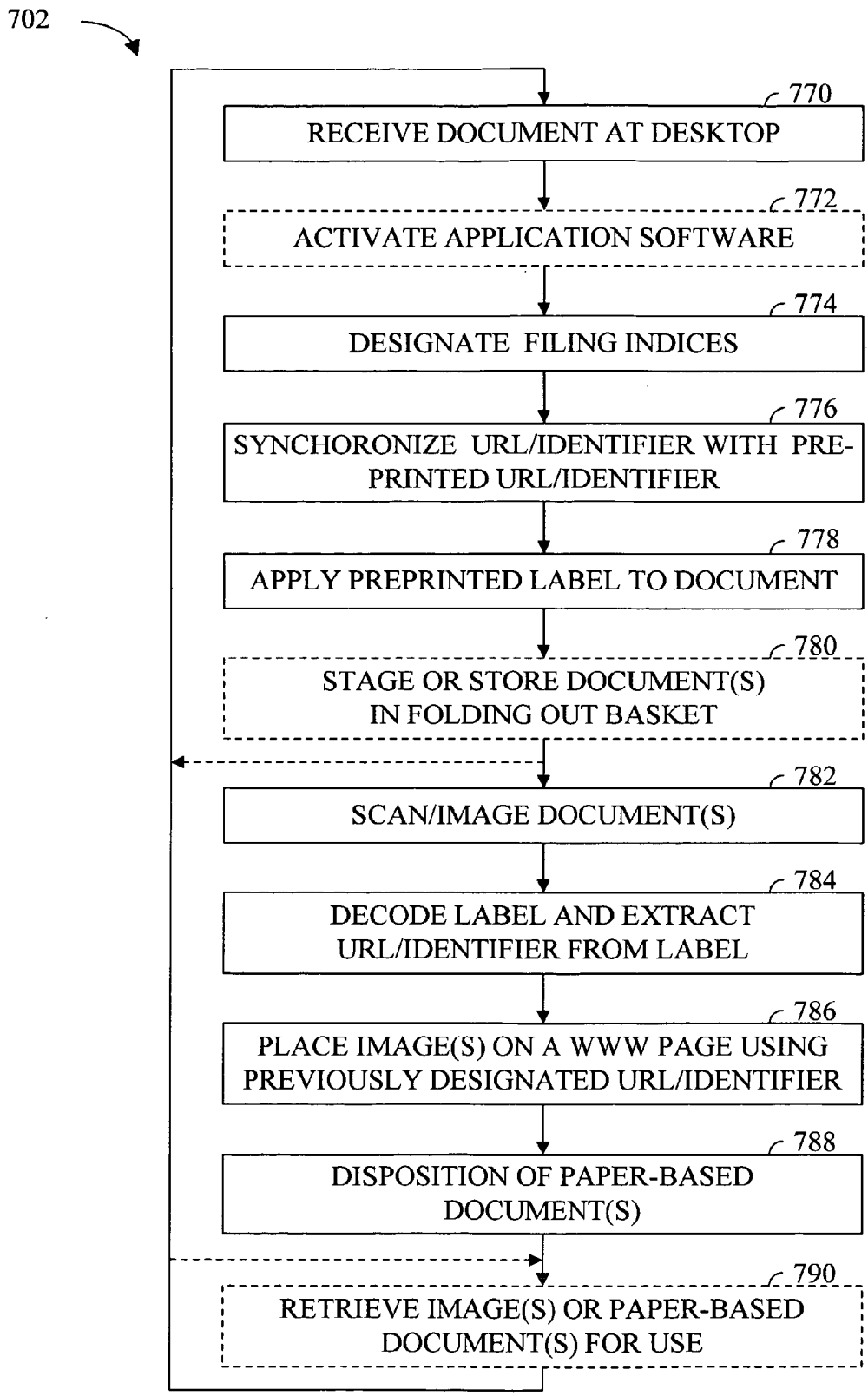
FIG. 7b is a flow chart for processing paper-based documents according to an alternative preferred embodiment of the present invention.

Referring now to FIG. 7b, a method 702 for processing documents according to an alternative preferred embodiment of the present invention is illustrated. All of the basic features and operational methods are similar to or identical to the steps described above in conjunction with FIGS. 7 and 7a. As shown in step 776 of FIG. 7b, this preferred embodiment of the present invention allows digital filing application 227 to create and/or synchronize a Uniform Resource Locator (URL) with any given document. By using this variation on the present invention, a user can automatically post paper-based documents to the World Wide Web (WWW) as shown in steps 784 and 786.

When using this specific embodiment of the present invention, the URL printed on the label becomes at least a portion of the URL for the digital image of the paper-based document on the World Wide Web, or an index pointer to the digital image of the paper-based document on the World Wide Web. This means that when the paper-based document is scanned (step 782) the bar code is decoded and the URL or the portion of the URL is extracted from the label (step 784). Then, digital filing application 227 can automatically create a web page and use the URL information from the label to name the URL for the digital image of the paper-based document. The URL is also stored in image index database 228. This allows the user to be directed to the appropriate page on the WWW by selecting the link for the desired document. For example, if the URL information contained in the label was 100100100, then the URL for the digital image or the paper-based document might be http://www.imaestorage.com/100100100. The URL or the index to the URL is assigned to the paper-based document at the time the pre-printed label is placed on the paper-based document and the web page is created at the time the paper-based document is scanned. As explained above, the pre-printed document identifier may be used as the URL or as a pointer to an index of URLs that are related to the unique identifier printed on the pre-printed label.

In summary, to retrieve the digital image of a paper-based document, the user will invoke digital filing application 227 separately or in conjunction with web browser 225 and employ the user interface to select the desired document. Digital filing application 227 references image index database 228 and uses the unique URL previously assigned for the desired document to locate the image of the paper-based document on the WWW. This URL is directly or indirectly related to the URL information printed on the pre-printed label that was applied to the paper document. Additional software support for image display, faxing, printing, integration, etc. can be provided directly by digital filing application 227 or web browser 225 or, alternatively by web browser 225 invoking other, supporting application software programs as necessary. As suggested by the arrows in FIG. 7b, this process can be repeated for each and every document that the user receives, if desired.

It should be obvious to those skilled in the art that the specific sequence of events shown in FIGS. 7, 7a, and 7b may be performed in an almost limitless number of combinations and sequences. Some steps may be eliminated, additional steps may be added, and many steps may be reordered. The specific combinations and sequences shown in FIGS. 7, 7a, and 7b are for illustration purposes only and should not be considered limiting.

It should be noted that several significant departures from traditional document image processing systems have been adopted in the methods of the present invention. According to several of the most preferred embodiments of the present invention, paper-based documents are indexed on demand, then physically labeled with a link (using a file name, i.e., globally unique number or URL) to their index, prior to scanning. At least a portion of the label contains a computer or machine-readable image filename, used by digital filing application 227 and residing in image index database 228. The document identifier printed on the bar-coded label is used by the scan sub-system to identify and relate to or to name the digital image of the paper-based document when it writes the document image to image repository 226, and to relate the image to the metadata stored in image index database 228, thereby completing the input process. This eliminates the need for the extensive hardware, software, network integration, and system and user process which is necessary when indexing occurs after scanning. For example, image indexing stations with large viewing monitors, network and local image caching and cache management, image input process staging, scan-index work scheduling, image indexing work, and update-write-commit activity are not needed with the preferred embodiments of the present invention.

The present invention, by pre-defining the document identifier and using it as the link between image index database 228 and the document images contained in document image repository 226, eliminates the need for a post-scan process to either update image index database 228 with an image storage location pointer, or to establish an intermediate lookup table for that purpose. Using the pre-printed document identifier to represent or relate to the final image file name and use the bar code to transport that file name/identifier with the related paper-based document is different from conventional document bar coding strategies that use bar-coded data solely to point to a database record housing additional, related index information. These methods or the present invention, part of the unique strategy of indexing documents prior to scanning, make it possible to implement a generic document imaging solution, i.e. "digital filing."

This process also allows the user to initiate control at the point of document receipt, i.e. the user's desktop. In addition, the traditional step-wise processes of monolithic imaging solutions have been isolated and separated into components that can be implemented independently, in many different ways. The operations for indexing, scanning and storing documents can be physically, temporally, and/or logically separated or disconnected. This allows optimized operational components to be assembled and implemented to best serve the needs of the users of the system. Finally, this compartmentalized digital filing process also provides a way for portions of the process to be outsourced to third party service providers that are logically disconnected from the indexing process. Control over the document is maintained by the user from initial receipt to the final disposition of the document and the transition of the paper-based document to a digital image.

For example, indexed and labeled documents can be scanned at a third party service provider location where the scanning subsystem will know how to name the image files based on the bar-coded information printed on the document label. Since these third party vendors will not be part of a dedicated system, the document input mechanism will not be logically connected to the computer system that indexed the documents. Digital images of the paper-based documents can be written to a removable, transportable image storage media (CD-ROM, DVD, etc.) for return to the originating system, where the existing image index database 228 will know how to access the images based on the document identifier. And/or, the images can be physically stored at a third party service provider facility, such as an Internet Service Provider, because image retrieval requests are web browser-based, employ Internet conventions, standard client-server processes, and reference a document number which identifies the document owner and coincides with the globally unique image filename/identifier at the designated location. Once again, image storage mechanism 130 is normally not logically connected to computer 200 at the time of image scanning or image storage, only at the time of image retrieval. This is in direct contrast to the traditional monolithic document imaging systems or hybrid outsourcing services of the past and is possible because the user of system 100 indexes the document and the system creates the storage file name/identifier for each document before the document is scanned, using the pre-printed globally unique identifier.

Digital filing application 227 can be provided as a single-user product and in network-capable versions. For the network version, image repository 226 and image index database 228 may reside on a server connected to any network, an Intranet, or the Internet. For networking environments, digital filing application 227 is downloaded from the network and the images, document numbers, and image index database records are all transferred via network connections and standard network interactions.

In addition, by implementing the user interface for the digital filing system as a web browser plug-in or JAVA applet, the standards, availability, functionality, and features of web browsers can be leveraged and utilized to great advantage. For example, the imaging engines already used by web browsers for viewing images can be used to provide on-screen visual representations for the imaged documents. An imaged document may be stored using the industry standard image formats known to those skilled in the art or later adopted in the industry. Since most standard web browsers can already read and display these various image formats, or automatically invoke other resources (i.e. third party document viewer web browser plug-ins) to display these standard image formats, there is no need to develop or provide proprietary image display, print, fax, e-mail, etc. mechanisms.

By establishing an open image file storage system where the image indexes are managed and maintained by a standard SQL database, the images are easily imported or exported into more sophisticated storage systems as the need arises. Since the digital images are stored in non-proprietary formats and are accessible via standard software packages, the digital images are easily transferred from one hardware/software platform to another. This feature allows a user and third party applications (document management systems, workflow systems) to easily access or change image repository storage facilities or to simply move document images from system to system as the user's needs change. The use of unique document identifiers also assures that documents from different systems can be combined into a single image repository while maintaining each document's unique identity.

Further, by isolating the indexing operation from the scanning and storage operation and by isolating the scanning operation from the indexing and storage operation, significant advantages can be realized. Specifically, it is anticipated that commercial third party service providers such as Kinkos® and AlphaGraphics® which provide service centers at various locations nationwide will enter the document scanning market. A user can index and apply a labels to documents in a batch, then transport the batch of indexed documents to a third party scanning service provider. The service provider scans the previously indexed documents and stores digital images of the documents onto a recordable, transportable media (i.e., CD-ROM, DVD, etc). The third party scanning service provider's software is an extension of digital filing application 227 and will, therefore, be capable of naming the digital images using the globally unique document identifier contained in each document's bar code portion 420. When the transportable media is re-introduced to system 100 a the user's location, image index database 228 can locate the scanned images by using the document identifier, which is now related to the image file name, or is the image file name. As an alternative to transportable media, images can be moved from a scan service provider back to the user site by any known communication lines. This method of outsourced scanning allows users to implement digital filing without incurring the costs of procuring dedicated scanning subsystems. Third party scanning can also be used for bulk, backfire conversions of existing documents.

Another important aspect of the present invention is the independence of the document identifier on the label and the document to which it is attached. In the various preferred embodiments of the present invention, there is no pre-determined or pre-established relationship between any given label and any given document. The labels can be assigned to any random document in any desired order without adhering to any specific document content-related protocol.

This is in stark contract to most known digital filing systems that rely on a pre-determined relationship between a document and the label. For example, many systems have established that a certain label must be placed on certain documents, in order to use the information contained on the label in the document storage/retrieval process. While useful in some highly structured filing applications, this requirement is too rigid and structured for many ad hoc filing systems. Accordingly, the methods of the present invention do not rely on this artificial constraint to relate the digital image to the paper-based document. Instead, the document identifier on the pre-printed label serves to tie any given pre-printed label to any given document, merely by placing the pre-printed label on the document and "synchronizing" the document identifier used by digital filing application 227 with the document identifier printed on the pre-printed label. If the same document is scanned or imaged more than one time, then each subsequent image is "versioned" or appended to the database with a new number. This allows for a document history to be created as a paper-based document travels through multiple stages as an information container.

Finally, third party document image storage providers can allocate storage space for a user's document images without worrying about the details of indexing and scanning. Fax machines, or similar machines modified for this specific purpose, can be used to scan and transmit images to third party image storage providers. Images can be transmitted over standard dial-up lines (like a present day fax transmission), dedicated communication lines, or the Internet. Users will be able to rent or lease storage space for their document images and will not be required to invest precious resources in the physical facilities and computer equipment necessary to archive volumes of digitized images. By using web browser 225 and digital filing application 227, a user can navigate to the desired storage location and access the stored image files, wherever they may be physically stored. This allows businesses to quickly and affordably adopt digital filing solutions without the traditional cost of image storage systems. It also creates widely accessible image repositories on a cost-effective, secure basis.

Figure 8:
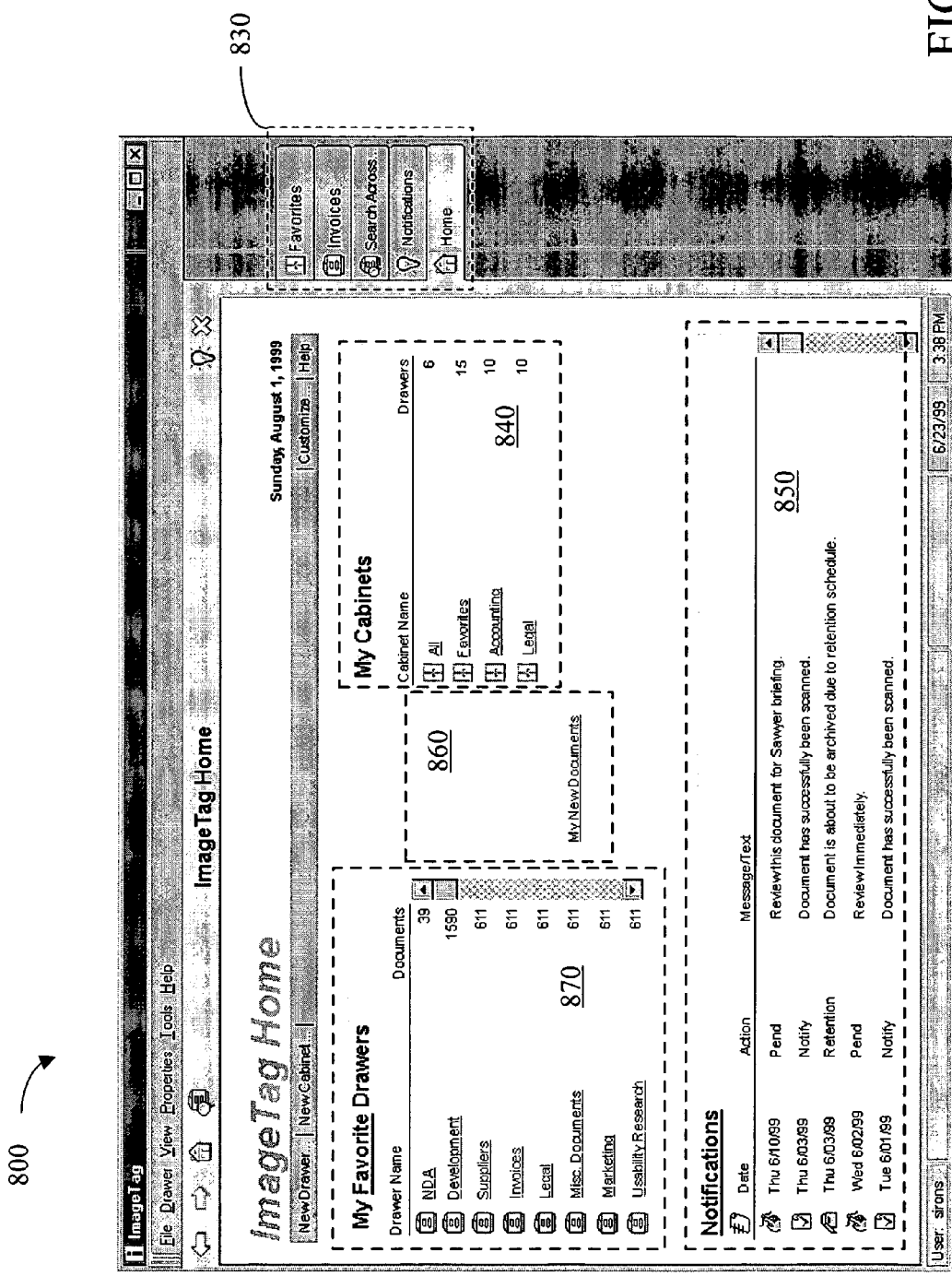
FIG. 8 is a screen shot of a user interface for storing a document using a digital filing system according to a preferred embodiment of the present invention.

Referring now to FIG. 8, a user interface 800 for indexing paper-based documents, and retrieving and managing digital images of the paper-based documents according to a preferred embodiment of the present invention is illustrated. User interface 800 is one example of a graphical user interface (GUI) that is suitable for use with the preferred embodiments of the present invention. As with other GUIs, user interface 800 makes extensive use of buttons, icons, and windows. Those skilled in the art will readily recognize that there are may possible variations on user interface 800. This specific embodiment is disclosed only for purposes of example and illustration and should not be considered limiting in any way.

As shown in FIG. 8, The user of system 100 can use interface 800 to specify the desired document storage category (cabinet) and subcategory (drawer) in image repository 226. User interface 800 interacts with the system level security components for digital filing application 227 to restrict access to sensitive documents and only allows users of system 100 to access appropriate documents. All cabinets available to a given user are listed in cabinet display area 840 and are represented by an appropriate icon. Each cabinet contains one or more drawers and the drawers for a given cabinet can be viewed by moving a mouse or other pointing device to the desired cabinet icon and clicking on the icon representing the desired cabinet. Cabinets and drawers are references to logical storage areas within image index database 228 and/or image repository 226. In addition, various drawers and/or cabinets may be configured to automatically export digital images and the related index information to other computer systems.

Tab display area 830 shows the user the currently opened interface items which can include both drawers and cabinets, as well as search features, notices relating to the status of various documents, system security settings, etc. Each individual tab displayed in tab display area 830 represents a separate screen "window" and the various windows may be displayed by clicking on the representative tab. In addition, a given display window may be removed by clicking on the appropriate screen icon, such as a standard windows "close box" icon.

New document area 860 is a representative icon which will allow a user to view newly scanned images for purposes of review and quality control. In the example of user interface 800, the user would click on the screen icon representing new document area 860 and a new tabbed window displaying the user's recently imaged documents will be displayed for review. Similarly, drawer display area 870 allows a user to access a given drawer by clicking on the icon representing the desired drawer. When the user clicks on a given drawer icon in drawer display area 870, a new tabbed window displaying the documents contained in that drawer is displayed. Once the document list is displayed, the user can view any given document by clicking on the icon representing the desired document.

Notification display area 850 displays a listing of notices relating to various documents and user-generated or system-generated actions for these various documents. Each notification shown in notification display area 850 provides feedback to the user regarding the status of documents and activities such as scanning and e-mail for the various documents. As with cabinets and drawers, the user can click on the desired notification and the notification will be expanded into a window on the screen for the user to review.

Figure 9:
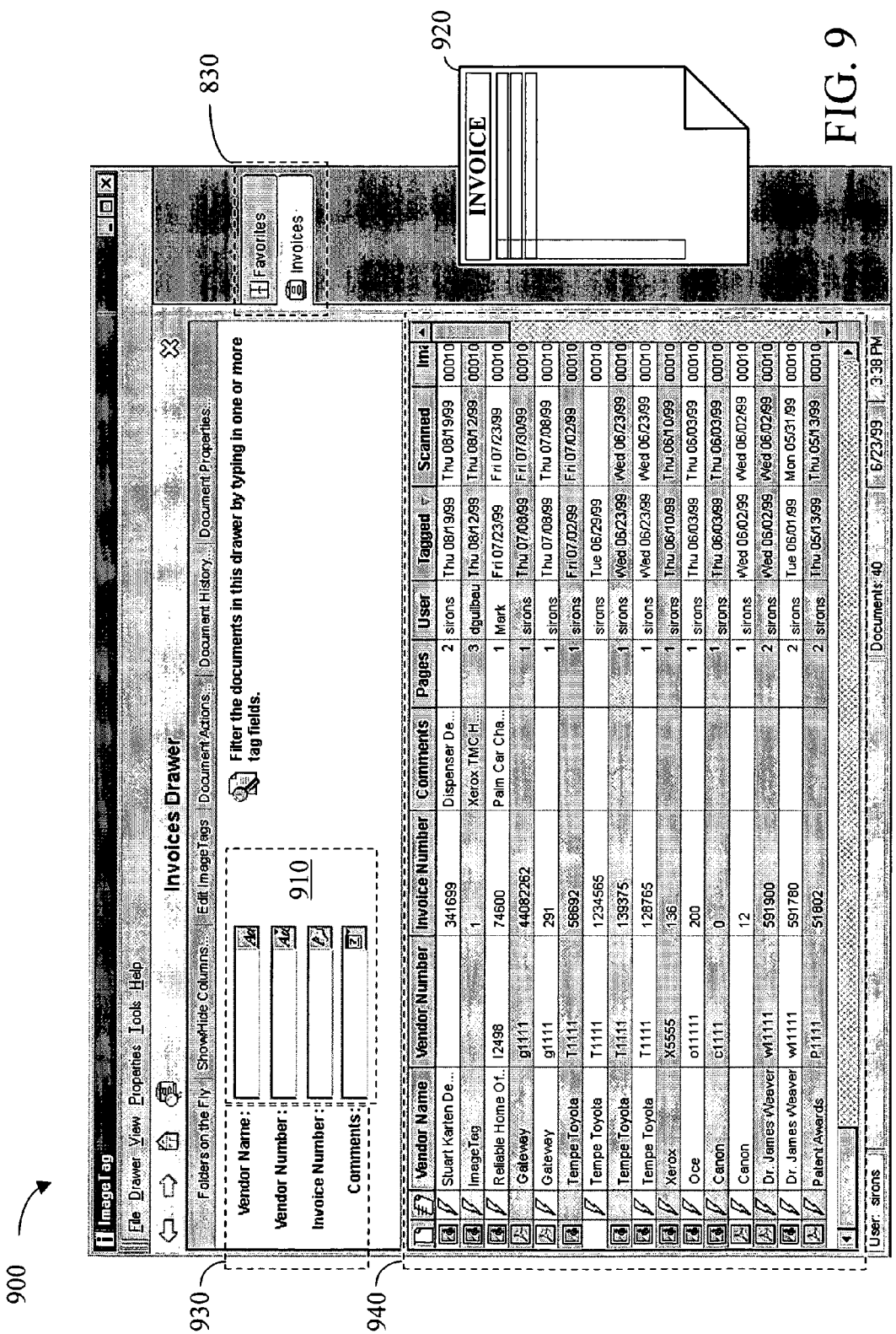
FIG. 9 is a screen shot of a user interface for retrieving a document using a digital filing system according to a preferred embodiment of the present invention.

Referring now to FIG. 9, a user interface 900 for a typical tabbed window for a typical drawer, a drawer named "invoices" is shown. In this example, the user may have selected the invoices drawer by clicking on the appropriate drawer icon from drawer display area 870. Alternatively, the user may have selected a particular cabinet containing the invoices drawer by clicking on an icon in cabinet display area 840. In either case, once selected, a new tabbed window entitled "Invoices Drawer" is displayed and all of the individual documents contained in the Invoices Drawer are shown in document display area 940. Each row in document display area 940 represents a single document and a user can view any digital image of any document contained in the Invoices Drawer by clicking anywhere on the row for the desired document. A series of icons on each document row provides visual feedback to the user regarding the current status of each document, such as whether or not the document has been scanned and whether or not there are additional activities related to a given document such as e-mail, pending notifications, etc. As before, tab display area 830 shows a tab for every window that is currently open and a new window can be displayed by clicking on the appropriate tab.

Figure 16:
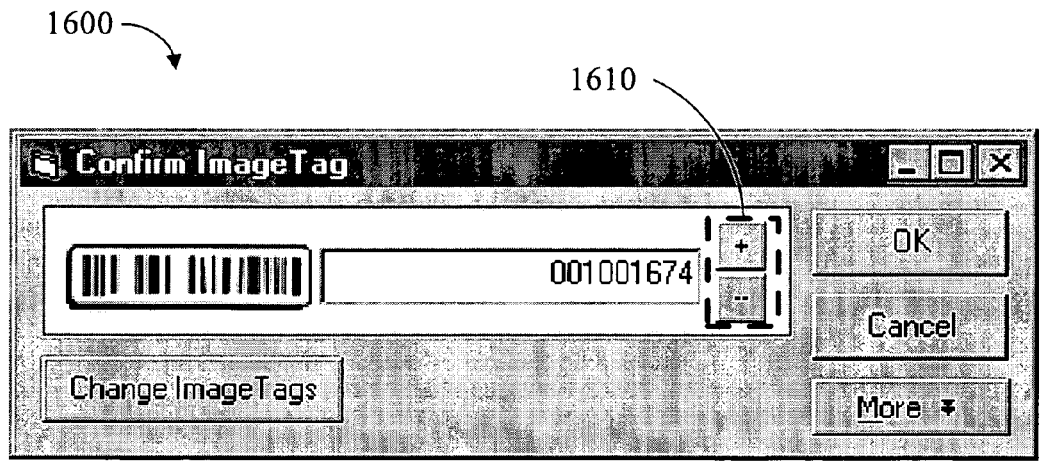
FIG. 16 is a screen shot of a user interface for synchronizing globally unique file identifiers in accordance with a preferred embodiment of the present invention.

As shown in FIG. 9, a paper-based document 920 is to be indexed, stored, and imaged for use with system 100. A document can be indexed for input into the system by using the index fields displayed in index display area 910. Each individual index field has a corresponding index name which is shown adjacent the index field in index field name display area 930. The user can add any additional desired indexing information, using the predetermined index fields for the documents in the selected cabinet and folder. It should be noted that the index fields contained in index display area 910 typically vary from drawer to drawer and are user-definable for each drawer. Once the paper-based document has been indexed, a new document identifier is generated/synchronized with the pre-printed labels at the user's desktop, a new row representing, in this case, paper-based document 920, appears in document display area 940. System 100 tracks a series or sequence of unique document identifiers for each user. Whenever a user logs into system 100 and indexes a new document, system 100 knows the next document identifier that should be available to that user. The user simply verifies that the unique identifier on the pre-printed label is the same as the document identifier expected by system 100. The user can interact with system 1100 and re-synchronize the next expected document identifier in system 100 to match the document identifier on the next pre-printed label, if necessary. A sample user interface for synchronizing the computer-expected document identifier with the physical label containing a document identifier is shown in FIG. 16. As further described in conjunction with FIG. 7 above, once the document identifier on the label is synchronized with the document identifier in system 100, the appropriate label is applied to the paper-based document and the document can be scanned whenever desired. Thus, when document 820 is later scanned, system 100 will store the digital image and reference the digital image for retrieval, using the previously generated/synchronized document identifier.

In the most preferred embodiments of the present invention, rapid entry techniques are programmatically implemented to speed the index process. The most preferred embodiments of the present invention will provide voice recognition features for data selection and entry, thereby allowing the user to quickly and easily index documents. It should be noted that the visual display shown in FIG. 9 lets the user select the logical location for storing the image of paper-based document 820 but digital filing application 227 will control the physical storage location of the digital image of document 820.

Figure 10:
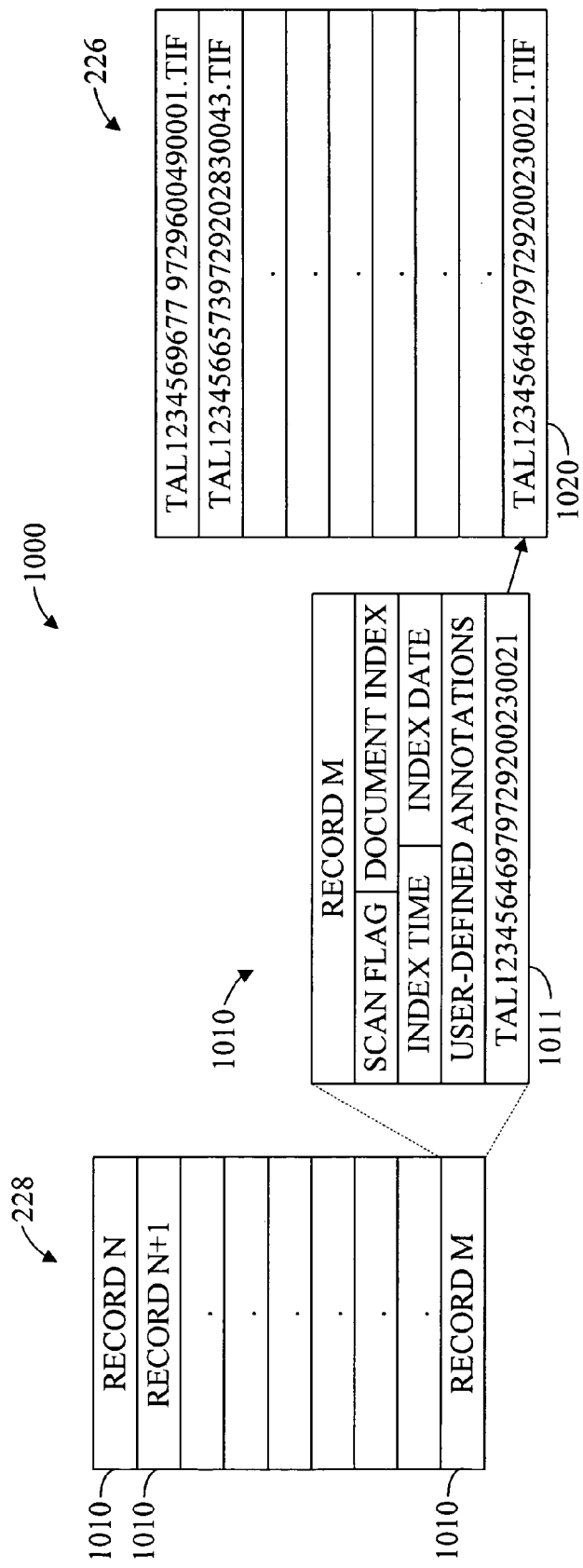
FIG. 10 is a block diagram of an image indexing and storage system according to a preferred embodiment of the present invention.

Referring now to FIG. 10, an indexing and storage system 1000 according to a preferred embodiment of the present invention is illustrated. As shown in FIG. 10, image index database 228 contains a series of records 1010. Each record 1010 contains a unique document number which is created by system 100 when a user indexes a paper-based document for inclusion in image repository 226 using the naming conventions explained above in conjunction with FIGS. 5 and 6. The unique document number for each record 1010 is stored in a field 1011 and, in this example, acts as a pointer to a specific image 1020 stored in image repository 226. As illustrated in FIG. 10, the name stored in field 1011 in each record 1010 is almost identical to the file name of the corresponding image stored in image repository 226. In the most preferred embodiments, the only difference between the document number and the corresponding image file name is the additional file name extension (.tif) for the image in image repository 226 which indicates that the referenced file is a TIFF file. As illustrated in FIG. 10, record 1010 may also contain additional fields for storing other information related to the image of the paper-based document. These other fields may include date and time of document indexing, a scan flag which indicates whether or not the paper-based document has been scanned or imaged, the document index information, user-defined annotations, etc. In addition, not all preferred embodiments of the present invention will utilize all of the fields specified.

Figure 11:
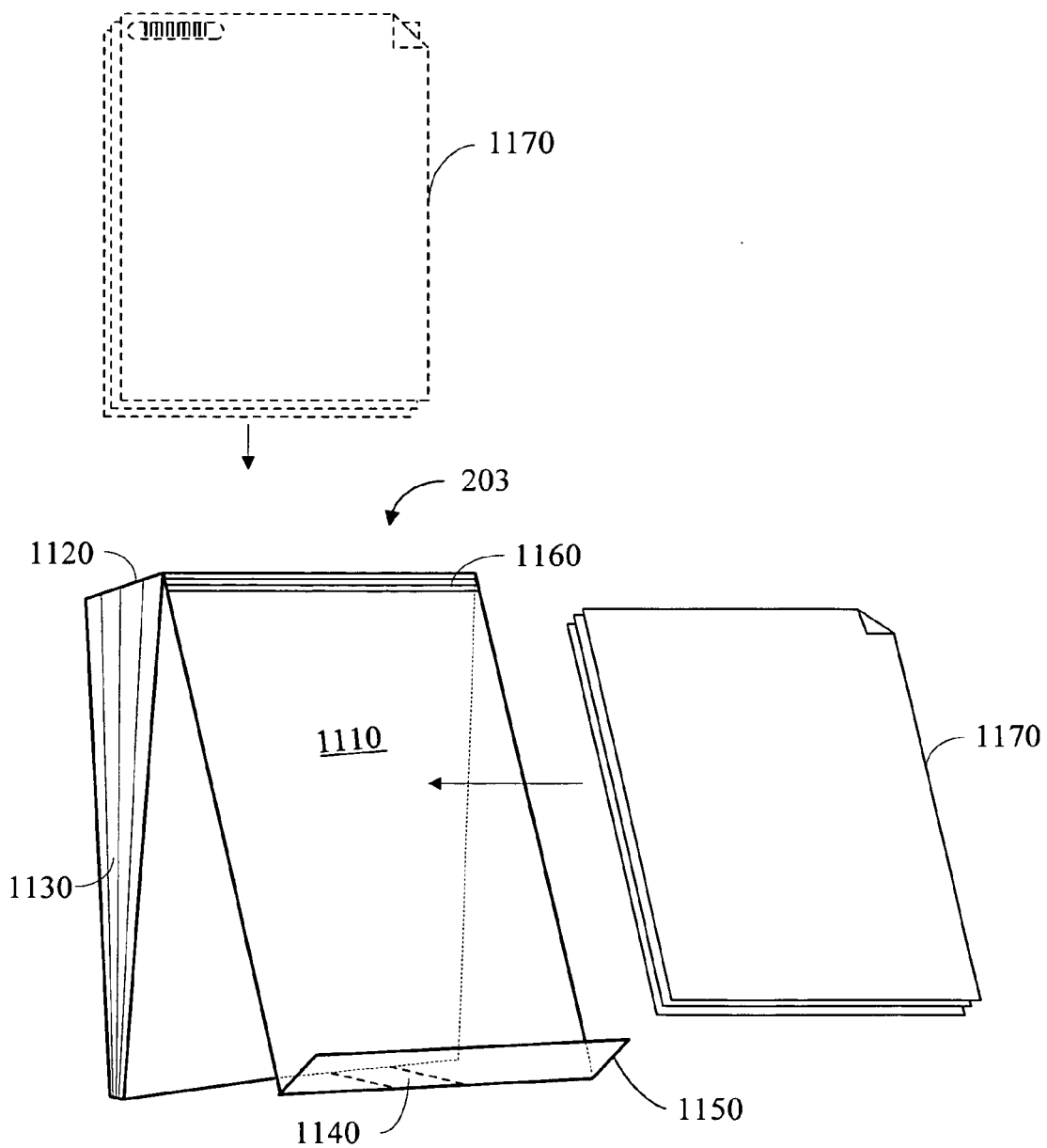
FIG. 11 is a perspective view of a folding out basket according to a preferred embodiment of the present invention.

Referring now to FIG. 11, a folding out basket 203 according to a preferred embodiment of the present invention includes: a document stand portion 1110; a flap portion 1150; an expandable document storage portion 1120 with two side portions 1130; a ribbed attachment portion 1160 and a selectively detachable connector portion 1140. In the most preferred embodiment, folding out basket 203 will be placed in the vicinity of computer 200 to facilitate the convenient staging of paper-based documents as they are received by the user. Folding out basket 203 is most preferably constructed from a lightweight, yet heavy-duty material such as stiff cardboard, card stock or thin, semi-rigid plastic. The goal is to manufacture a lightweight yet sturdy folding out basket 203.

In the most preferred embodiments of the present invention, document stand portion 1110 is attached to expandable document storage portion 1120 at one end by ribbed attachment portion 1160. Selectively detachable connector portion 1140 is used to selectively connect the ends of document stand portion 1110 and expandable document storage portion 1120 that are opposite from the ends that are attached with ribbed attachment portion 1160.

To use folding out basket 203, a user will attach selectively detachable connector portion 1140 between document stand portion 1110 and expandable document storage portion 1120. Selectively detachable connector portion 1140 serves two main functions. First, selectively detachable connector portion 1140 will provide stability to folding out basket 203, acting in concert with document stand portion 1110 and expandable document storage portion 1120 to form a pyramid-like structure, thereby preventing the bottom of document stand portion 1110 and the bottom portion of expandable document storage portion 1120 from separating from each other. Second, selectively detachable connector portion 1140 will serve as a closure mechanism, allowing the user to safely transport documents 1170 which have been placed into expandable document storage portion 1120.

After set up, a user will place one or more documents 1170 on document stand portion 1110, with the bottom of the documents 1170 resting on flap portion 1150. The user will index each document 1170 in accordance with one of the preferred embodiments of the present invention, as described in FIGS. 7, 7a, and 7b. After placing a label on the document 1170, the user will place document 1170 into expandable document storage portion 1120. Expandable document storage portion 1120 resembles a pouch and is capable of receiving documents 1170 into the interior space of expandable document storage portion 1120. In the most preferred embodiment, side portions 1130, located on the side walls of document storage portion 1120, include accordion-like folds that allow expandable document storage portion 1120 to accommodate documents of various thicknesses, as well as multiple documents 1170.

Once all of the documents 1170 have been indexed and placed into expandable document storage portion 1120, document stand portion 1110 can be rotated, using ribbed attachment portion 1160 as a pivot point so that ribbed attachment portion 1160 is folded over the opening of document storage portion 1120. Then, flap portion 1150 can be attached to document storage portion 1120 using selectively detachable connector portion 1140, thereby securing documents 1170 inside expandable document storage portion 1120. Ribbed attachment portion 1160 allows flexibility for covering the opening of expandable document storage portion 1120, since the ribbing can accommodate various thicknesses of expandable document storage portion 1120. The user can then utilize folding out basket 203 to transport documents 1170 to a scanning/imaging location for input into system 100. The exact dimensions of folding out basket 203 will be determined based on the type, number, and dimensions of the papers to be staged and stored in folding out basket 203.

Optional sleeves or receptacles (not shown) may be attached to the front or the back of document stand portion 1110 or the interior or exterior of expandable document storage portion 1120. These optional sleeves or receptacles may be used to store user identification cards and/or any special instructions the user desires to include for processing documents 1170 such as unique handling directions or routing information. In addition, pre-printed "special handling" cover sheets to set up the scanner for each specific scanning job could be included in an external/internal sleeve/receptacle.

Figure 12:
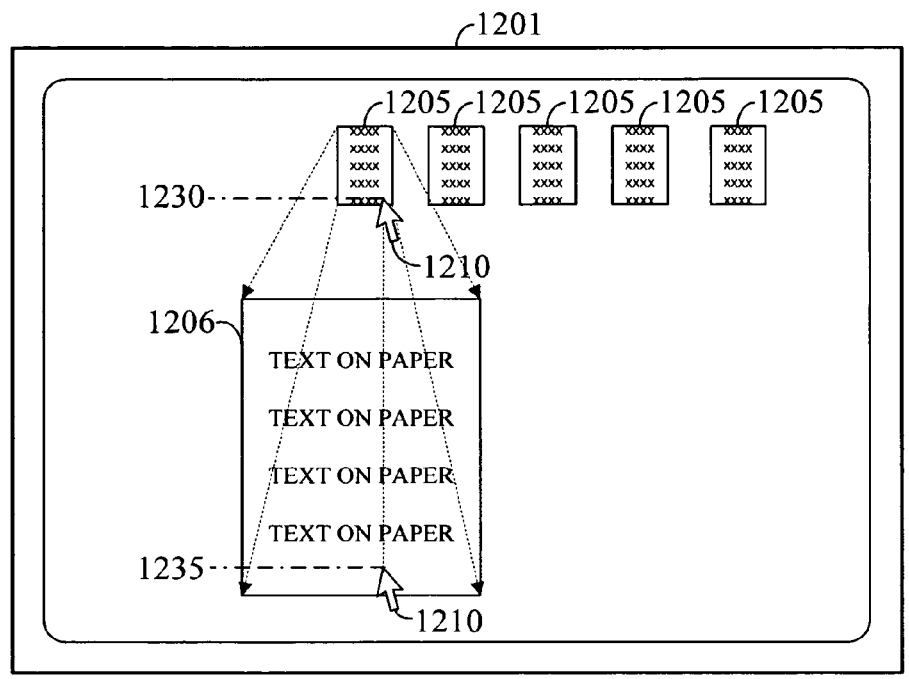
FIGS. 12, 13, and 13a are simplified views of a user interface for dynamically re-sizing and rotating digital images of a paper-based document according to a preferred embodiment of the present invention.
Figure 13:
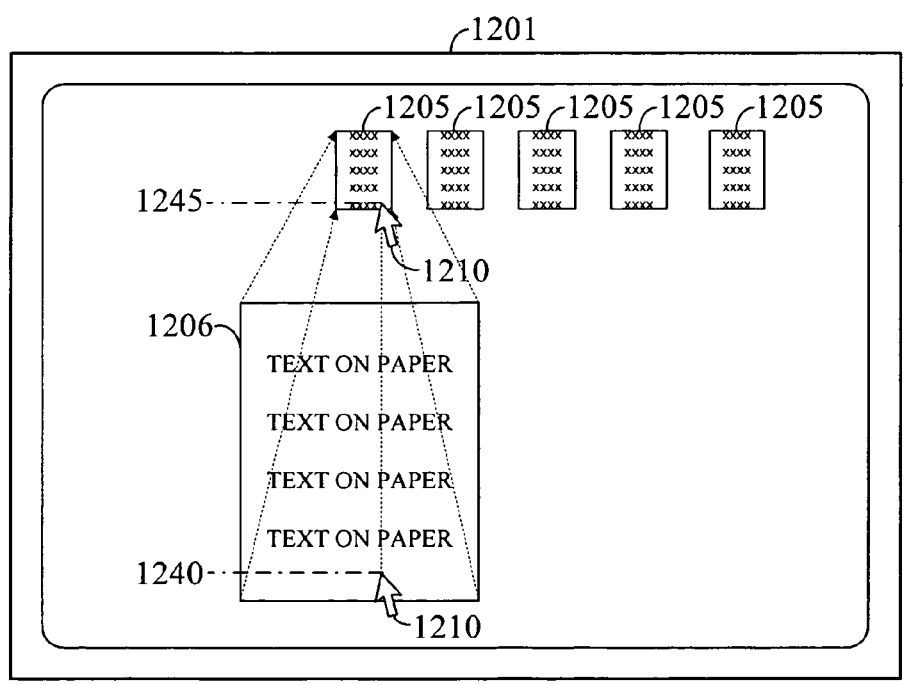
Figure 13A:
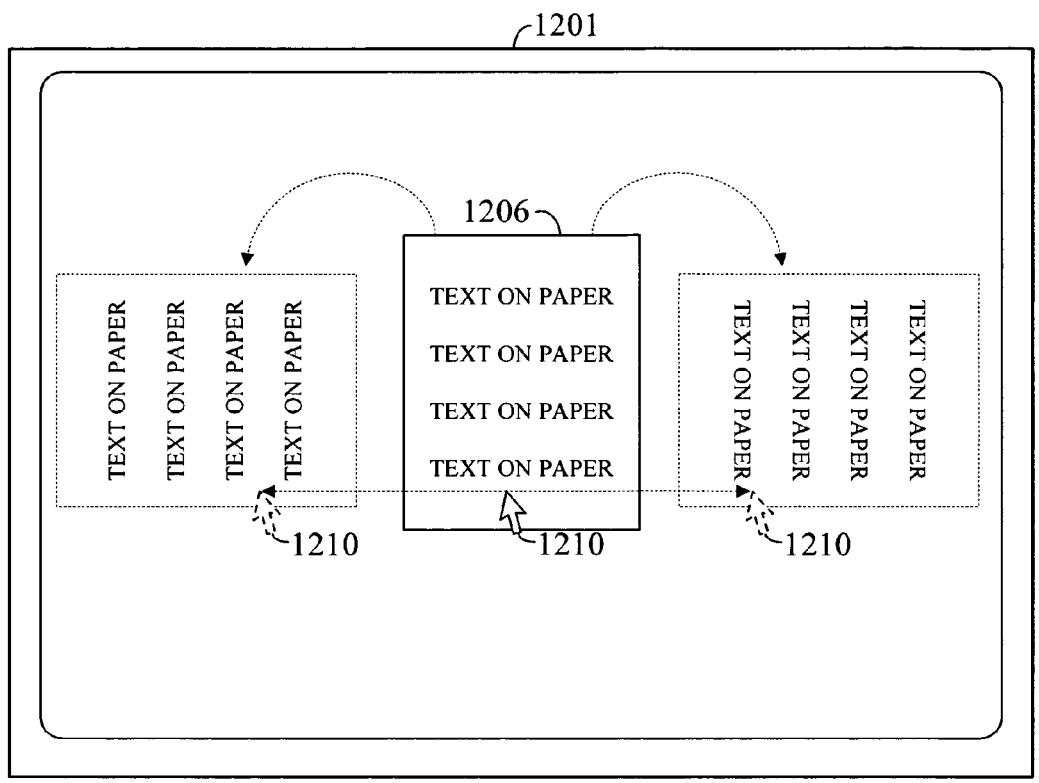

Referring now to FIGS. 12, 13, and 13a, a user interface for dynamically resizing and rotating digitally displayed images of paper-based documents is illustrated. As shown in FIG. 12, a paper-based document has been indexed and scanned using system 100 and the pages of the paper-based document are displayed as a series of thumbnails icons on a computer monitor 1201. First position 1230 and second position 1235 represent two different locations on the screen of monitor 1201. To dynamically resize one of the thumbnail icons 1205, making the selected thumbnail 1205 larger, the user will place a cursor 1210 over the selected thumbnail icon 1205 at a first position 1230. The user will then "click and drag" the cursor in a downward fashion to a second position 1235. As shown in FIG. 12, as the user moves cursor 1210 from first position 1230 to second position 1235, the selected thumbnail icon 1205 increases in size as the mouse is moved downward.

Similarly, as shown in FIG. 13, the process can be reversed by starting at a first position 1240 and moving cursor 1210 upward to a second position 1245, thereby decreasing the size of the selected thumbnail icon 1205. In yet another variation of the preferred embodiments, the user can merely "click" on the thumbnail and the full size digital image will be displayed. This is especially useful for review of image quality.

Referring now to FIG. 13*a*, a user interface for rotating digital images of paper-based documents according to a preferred embodiment of the present invention is illustrated. In the most preferred embodiments of the present invention, a sideways movement of cursor 1210 in a horizontal direction will rotate the digital image in 90° increments. For example, clicking on digital image 1206 in a first location and then dragging towards the left in a horizontal direction will rotate digital image 1206 90° to the left. Similarly, clicking of digital image 1206 in a first location and then dragging towards the right in a horizontal direction will rotate digital image 120 90° to the right. Combinations of these various click and drag movements will allow a user to quickly and easily resize and rotate digital image 1206.

Figure 14:
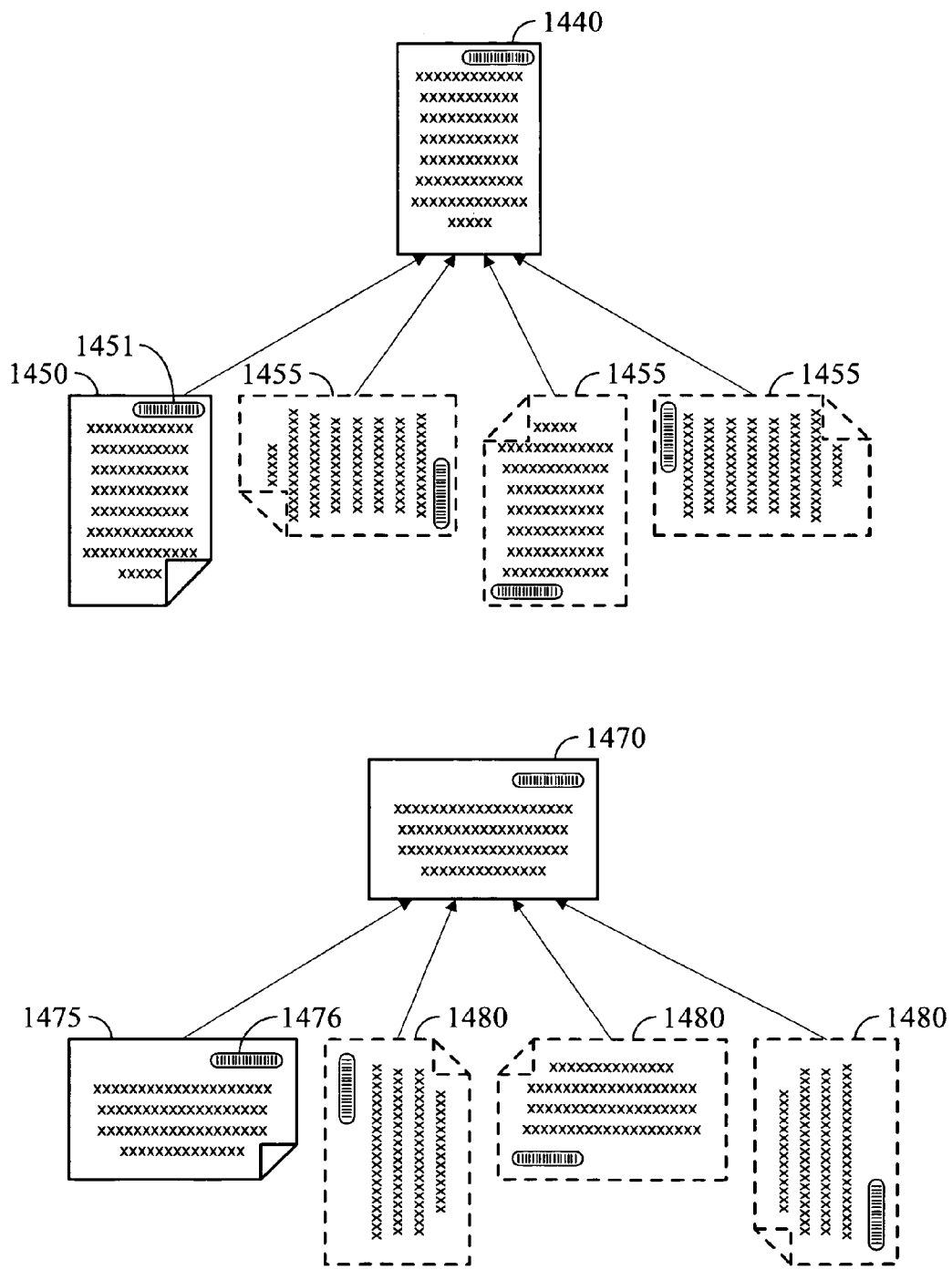
FIG. 14 is a diagrammatic view representing the functionality of an auto-rotate mechanism in accordance with a preferred embodiment of the present invention.

Referring now to FIG. 14, the functionality of an auto-rotate mechanism 223 (shown in FIG. 2) according to a preferred embodiment of the present invention is illustrated. Because most scanning devices accept paper-based documents in a variety of orientations relative to the scanner feed path, it is possible to scan documents in four basic orientations. For portrait oriented documents, these various orientations are shown in FIG. 14 by document 1450 and documents 1455. Most commercial scanning devices will accept a paper-based document in any of the four orientations shown for document 1450 and documents 1455. However, these scanning devices generally display the digital image of the scanned paper-based document according to how it was scanned. This means that in 3 out of 4 scanning orientations, the digital image of the paper-based document will be displayed so that the eye-legible content is rotated out of the normal reading position when presented on the computer monitor. While this problem can be corrected in a post-scan operation, this additional step is non-productive and generally undesirable.

In FIG. 14, a paper-based document 1450 is a document with text or graphics in a standard portrait reading orientation and a label 1451 placed on the upper-right hand corner of document 1450. The eye-legible content on label 451 is oriented to match the reading orientation of the text or graphics printed on document 1450. Paper-based documents 1455 represent various alternative orientations for presenting a paper-based document to a scanner feed path. In a standard scanning operation, each of the four orientations would produce a different orientation for the digital image of the paper-based document.

Auto-rotate mechanism 223 will determine the orientation of the eye-legible content on the label and automatically rotate and orient the scanned image as necessary to present the digital image in the proper reading orientation, regardless of the orientation or the paper-based document and relationship of the document to the scanner feed path. Specifically, most labels will have a numeric bar code somewhere on the label. System 100 can read the bar code and detect the most significant digit of the label and the least significant digit of the bar code printed on the label, thereby determining the orientation of the eye-legible content on the label. In addition, other versions of labels with text only eye-legible content may be read by OCR technology to automatically rotate the digital images according to the orientation of the eye-legible content. Since the reading orientation of label 1451 typically matches the reading orientation of the text and graphics on paper-based document 1450, the resulting digital image 1440 will be displayed in the optimal reading orientation regardless of the orientation of the paper-based document when scanned.

In the most preferred embodiment of the present invention, auto-rotate mechanism 223 uses the most significant digit of the bar code printed on label 1451 to determine the correct orientation for digital image 1440. In a similar fashion, a landscape orientated, paper-based document 1475 can be displayed as a digital image 1470 with the correct orientation regardless of the orientation of document 1475 and documents 1480 to the scanner feed path. This assumes, once again, that the reading orientation of the eye-legible content on label 1476 on paper-based document 1475 matches the reading orientation of the text and/or graphics printed on paper-based document 1475. In yet another preferred embodiment of the present invention, the user may also specify specific orientations and rotational preferences.

Figure 15:
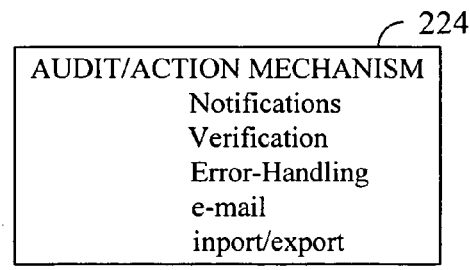
FIG. 15 is a diagrammatic view of an audit/action mechanism in accordance with a preferred embodiment of the present invention.

Referring now to FIG. 15, a conceptual view of an audit/action mechanism according to a preferred embodiment of the present invention is illustrated. Since the various preferred embodiments of the present invention are specifically designed to be used in a index-before-scan operational fashion, there are certain advantages that can enhance productivity and increase overall system integrity. Specifically, by using audit/action mechanism 224, many previously unavailable system performance and tracking indicators can be developed.

As shown in FIG. 15, audit/action mechanism 224 can be activated and used to provide functionality such as notifications, verification, error-handling, e-mail, and import/export capabilities for users of system 100. These functions are especially important to maintain the integrity of the system when multiple users are indexing, scanning, and retrieving documents. Each of these specific elements is described below. The implementation of these various functions are possible because the unique index-before-scan methods of the present invention allow system 100 to develop and maintain an inventory of documents prior to creating any digital images. Once the digital images are created, system 100 can use the previously created inventory to validate the performance or identify failure points within the system. The result is a high level of confidence for users of system 100. Audit/action mechanism 224 continually parses the various databases that store information regarding the digital images of the paper-based documents and executes any indicated post-scan operations or instructions.

Notifications are system-generated messages that provide feedback to a user regarding the status of paper-based documents and the resulting digital images when using system 100 of FIG. 1. Since each unique document identifier is assigned to an individual user, system 100 can generate messages for the individual users whenever a document with a label belonging to a given user is scanned. These various notifications can be "stored" by system 100 and identified for later execution, once the document is scanned. For example, once a user has indexed a paper-based document according to one of the preferred embodiments of the present invention, the notification capability of audit/action mechanism 224 can send the user a message when the paper-based document is scanned and the resulting digital image is ready for viewing. Similarly, using management-by-exception theories, if a pre-determined amount of time has expired and the paper-based document has not yet been scanned, the notification capability of audit/action mechanism 224 can send the user a message to that effect and the user can take the appropriate action. Those skilled in the art will recognize that there are many other, similar types of notifications that could be generated by audit/action mechanism 224. These additional notifications include e-mail verification, document retention messages, etc. It is important to note that all of the actions can be "queued" for execution, prior to scanning the documents. The unique document identifier allows the stored actions to be executed for the correct document at the time the document is scanned.

In addition to notification, audit/action mechanism 224 can provide verification functions for system 100. For example, in the case of certain high-priority documents, the user may specify that a verification message should be generated just as soon as the paper-based document is scanned. This will allow the user to track important documents through system 100 and verify that the documents are available and secure.

In addition to the above-specified functionality, the error-handling capabilities of audit/action mechanism 224 provide additional confidence regarding the integrity of documents stored in system 100. For example, since documents can be indexed prior to scanning, audit/action mechanism 224 can check the characteristics of the paper-based documents and compare them against the actual paper received at the scanning subsystem. For example, a user, during the index process may specify that a document has 10 pages. When the document is subsequently scanned, the scanning subsystem can "count" the actual pages scanned and send the user a message if the page count is incorrect. In addition, if any document identifier are synchronized with system 100 and do not show up, a message can be generated alerting the user that a document is missing.

Another important function for audit/action mechanism 224 is the generation of e-mail messages containing digital images of paper-based documents that are imaged using system 100. A user may specify that a digital image of any given paper-based document be sent to another individual using an e-mail message. This can happen before or after the document is scanned. If the document has not yet been scanned when the user specifies an e-mail action, audit/action mechanism 224 will store the relevant e-mail address, recipient, and other important data and "que" the e-mail to be sent. Once the paper-based document is actually scanned, audit/action mechanism 224 will attach the digital image of the paper-based document to the e-mail and send it out using standard e-mail protocols.

Recognizing the need to work within the parameters and confines of existing systems, audit/action mechanism 224 allows for the simple import and export of images. The most preferred embodiment of audit/action mechanism 224 uses extensible markup language (XML) to perform these functions. For example, a user may wish to send digital images from system 100 to a document management system. The user can specify the export destination before or after the document is scanned. As with e-mail, if the paper-based document has not yet been scanned, audit/action mechanism 224 will retain the relevant export information and export the digital image when the paper-based document is scanned.

One other important feature of digital filing application is the functionality provided by security mechanism 221, shown in FIG. 2. Security mechanism 221 offers security for the digital images of the paper-based documents stored in image repository 226. Users of system 100 can specify how secure an image should be and system 100 will only allow authorized users to access the stored images. Since a document can be indexed prior to scanning, it is possible to specify the desired level of security prior to the creation of the digital image for a given paper-based document. This is far more secure than commercial systems which employ a scan-then-index methodology. If the paper-based document is scanned prior to indexing, the image must be cached and made available on the system for subsequent indexing. This means the image is stored in a way that may compromise the security of the content. This security feature is very important for images that contain sensitive material. Since each globally unique identifier on each pre-printed label can be assigned to an individual user, security mechanism 221 can provide security for a digital image of a paper-based document by referencing the globally unique identifier that is printed on each of the pre-printed labels at the time the document is scanned. By checking the user identification for the user requesting access and comparing it against the registered owner of the globally unique identifier contained in the document image, security mechanism 221 can control access to the requested image.

Referring now to FIG. 16, a screen shot of a user interface 1600 for synchronizing globally unique file identifiers in accordance with a preferred embodiment of the present invention. By interacting with user interface 1600, a user of digital filing application 227 can synchronize globally unique file identifiers. As shown in FIG. 16, user interface 1600 employs a synchronization mechanism 1610 for synchronizing globally unique file identifiers. In the most preferred embodiments of the present invention, synchronization mechanism 1610 comprises a set of +/− indicators which allow the user to incrementally change the globally unique file identifier up or down as needed to make sure that the is synchronized with the pre-printed labels. Although synchronization mechanism 1610 is depicted as a set of +/−indicators, those skilled in the art will recognize that synchronization mechanism 1610 could utilize many other forms of indicators such as up/down arrows or other similar mechanisms.

Figure 17:
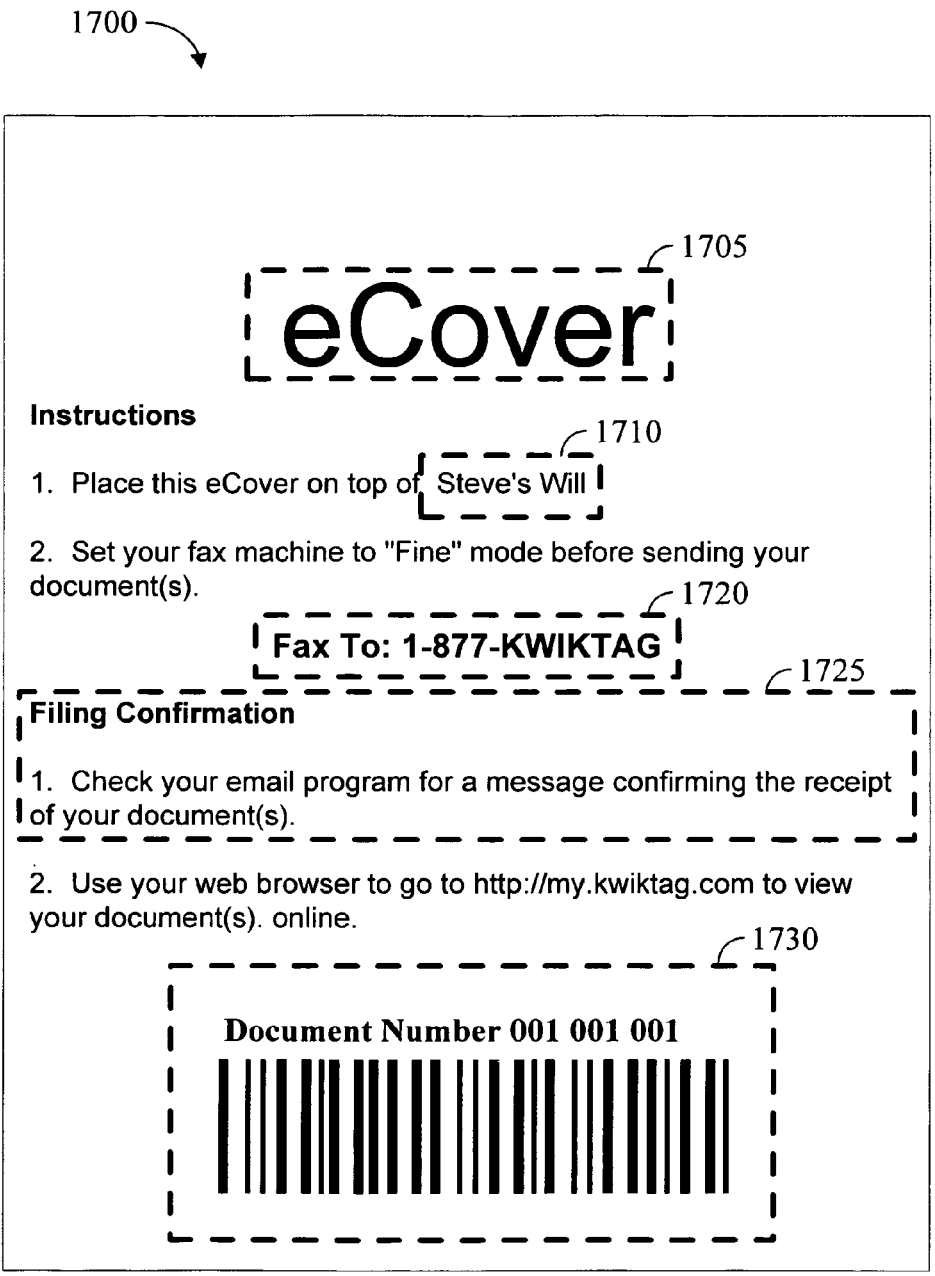
FIG. 17 is a sample image of a dynamically generated fax cover sheet in accordance with a preferred embodiment of the present invention.

Referring now to FIG. 17, a sample image of a dynamically generated fax cover sheet 1700 in accordance with a preferred embodiment of the present invention is illustrated. Each dynamically generated fax cover sheet 1700 will contain at least one dynamic content zone. As shown in FIG. 17, dynamically generated fax cover sheet 1700 contains three different dynamic content zones, dynamic content zone 1710, dynamic content zone 1720, and dynamic content zone 1730. Additionally, each fax cover sheet may also contain one or more static content zones. As shown in FIG. 17, dynamically generated fax cover sheet 1700 contains two different static content zones, static content zone 1705, and static content zone 1725.

Referring now to FIGS. 1, 2, and 17, the dynamic content zones will contain the user-specific information relative to the document being filed by digital filing mechanism 227 and will be generated by a dynamic content generation process using both user-supplied information and system-supplied information stored in image index database 228.

For purposes of illustration, consider a user who wishes to use digital filing application 227 to file an executed will, in order to have a copy of the executed will, with signatures, stored on-line. In this case, as shown in FIG. 17, dynamic content zone 1710 contains the title of the document to be filed. The contents of dynamic content zone 1710 are user-supplied during the interaction with digital filing application 227 and are found in image index database 228. In contrast, dynamic content zone 1720 and dynamic content zone 1730 contain system-supplied content. In this example, the content of dynamic content zone 1720 is a fax phone number which is identified with the user and which can be dynamically altered based on the user profile. In a "free demo" version of the system, the user may be required to use a toll call to access communication link 120. In a different scenario, the user profile may direct the system to place a toll-free fax number into dynamic content zone 1720. Dynamic content zone1730 contains the globally unique file identifier associated with the document to be filed, which is stored in image index database 228. By using the dynamic content zones, the user is provided with a visual cue regarding which fax cover sheet should be placed on which document and how the document should be transmitted to digital filing system 100.

This is especially important in applications and situations where multiple documents are to be batched together and imaged in a single session. If there are multiple documents with multiple dynamically-generated fax cover sheets 1700, it is very important to match up the correct dynamically-generated fax cover sheet 1700 with the corresponding document to be filed. The use of dynamic content zones 1730 facilitates the coordination of the appropriate dynamically-generated fax cover sheet 1700 by allowing the user to visually inspect the content of the dynamic content zones to ascertain which document should be filed using which dynamically-generated fax cover sheet 1700.

During the filing process, digital filing application 227 references image index database 228 and uses the globally unique identifier previously created for the desired document to take meta-data from image index database 228 and places it into the dynamic content zones on dynamically-generated fax cover sheet 1700. The user can then print dynamically-generated fax cover sheet 1700 on a local or network printer and then place it in front of the appropriate document. Then, the user can simply use document input mechanism 110 (in this case, a fax machine) to transmit the document to digital filing system 100 via communication link 120. By printing document-specific and/or user-specific information into dynamic content zones 1710, 1720, and 1730, the user can match the appropriate dynamically-generated fax cover sheet 1700 with the appropriate paper-based document. In addition, digital filing application 227 can be user-configurable to allow the user to specify which document-specific and/or user-specific information is placed into dynamic content zones 1710, 1720, and 1730. Other than the globally unique document identifier, there is no requirement that any additional document-specific and/or user-specific information be printed on dynamically-generated fax cover sheet 1700.

As explained above, the present invention provides an apparatus and method for a digital filing system. The preferred embodiments of the present invention provide for easy and effective indexing, imaging, storing, retrieving and managing of paper-based documents, transforming them into electronic documents using a system which incorporates many existing office resources. The proposed system and method implements a desktop solution for digital filing, which can be made available to each worker. In one embodiment of the present invention, an individual has complete control over the electronic storage and retrieval of their documents from a standard desktop computer, using a dedicated digital filing application or a standard web browser application.

One of the more critical parts of the present solution is the maintenance of globally unique document identifier. The integrity of document images can be assured by controlling the globally unique document identifier printed on each dynamically-generated fax cover sheet. In addition, proprietary check digits, ensigns, and other secure printing techniques may be used to maintain the integrity of the digital filing process.

In summary, each dynamically-generated fax cover sheet may contain any combination of dynamic and/or static content zones. In addition, the dynamic content zones may contain variable user-generated meta-data or system-generated variable information. The information contained in the dynamic content zones will typically vary from document to document any also by user. The static content zones may contain any information relative to the system that does not necessarily change from document to document. Finally, with the exception of the globally unique document identifier, the user may control what types of information is contained with the dynamic content zones.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
    at least one processor;
    a memory coupled to the at least one processor;
    at least one digital image of a paper-based document, the digital image comprising at least one image of a dynamically generated fax cover sheet, the at least one digital image residing in the memory; and
    a digital filing application residing in the memory and being executed by the at least one processor, the digital filing application extracting a globally unique identifier from the image of the dynamically generated fax cover sheet and using the globally unique identifier to link the digital image to a database record which was created prior to the creation of the digital image.

2. The apparatus of claim 1 wherein the digital filing application links the digital image to the database record by using at least a portion of the globally unique identifier to create a file name for the digital image.

3. The apparatus of claim 2 wherein the at least a portion of the globally unique identifier is the file name for the digital image.

4. The apparatus of claim 1 further comprising a communication link coupled to the at least one processor.

5. The apparatus of claim 4 wherein the communication link comprises a computer network.

6. The apparatus of claim 4 wherein the digital filing application transfers the digital image of the paper-based document to an image repository via the communication link.

7. The apparatus of claim 5 wherein the computer network is the internet.

8. The apparatus of claim 5 wherein the computer network is an intranet.

9. The apparatus of claim 1 wherein the globally unique identifier comprises a number represented as a bar code on the digital image of the dynamically-generated fax cover sheet.

10. The apparatus of claim 1 wherein the dynamically generated fax cover sheet comprises at least one dynamic content zone.

11. The apparatus of claim 10 wherein at least one of the at least one dynamic content zone contains the globally unique identifier.

12. The apparatus of claim 10 further comprising at least one static content zone.

13. The apparatus of claim 11 wherein the globally unique identifier comprises a number represented as a bar code on the dynamically generated fax cover sheet.

14. The apparatus of claim 1 wherein the dynamically generated fax cover sheet comprises a plurality of dynamic content zones.

15. The apparatus of claim 14 further comprising a plurality of static content zones.

16. The apparatus of claim 14 wherein at least one of the at least one dynamic content zone contains the globally unique identifier.

17. A method comprising the steps of:
- printing a dynamically-generated fax cover sheet, the fax cover sheet containing at least one dynamic content zone, wherein at least one of the at least one dynamic content zones contains a globally unique identifier;
- indexing a paper-based document using a digital filing application, thereby creating a record in a database describing the paper-based document;
- processing the dynamically-generated fax cover sheet and the paper-based document to create a digital image of the paper-based document and the dynamically-generated fax cover sheet, wherein the dynamically-generated fax cover sheet acts as a fax cover sheet for the paper-based document;
- extracting the globally unique identifier from the digital image;
- storing the digital image in a file, using the globally unique identifier to name the digital image and to link the digital image to the record in the database.

18. The method of claim 17 further comprising the step of de-speckling and de-skewing the digital image of the paper-based document.

19. The method of claim 18 further comprising the step of using an auto-rotate mechanism to automatically rotate the digital image, based on the orientation of the globally unique identifier.

20. The method of claim 18 further comprising the step of using a security mechanism to control access to the digital image.

21. The method of claim 20 wherein the step of using a security mechanism to control access to the digital image of the paper-based document comprises the steps of:
- assigning a range of globally unique identifiers to a specific user;
- comparing the globally unique identifier associated with the digital image with a list of globally unique identifiers assigned to a user requesting access to the digital image;
- verifying that the globally unique identifier is assigned to the specific user when access to the digital image is requested and allowing access only in those cases where the globally unique identifier is assigned to the specific user requesting access to the digital image.

* * * * *